(12) United States Patent
Mizrahi et al.

(10) Patent No.: US 9,415,568 B2
(45) Date of Patent: *Aug. 16, 2016

(54) FORMABLE LIGHT WEIGHT COMPOSITE MATERIAL SYSTEMS AND METHODS

(75) Inventors: Shimon Mizrahi, Haifa (IL); Moshe Narkis, Haifa (IL)

(73) Assignee: PRODUCTIVE RESEARCH LLC, West Bloomfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/027,423

(22) Filed: Feb. 15, 2011

(65) Prior Publication Data

US 2011/0200816 A1 Aug. 18, 2011

Related U.S. Application Data

(60) Provisional application No. 61/304,640, filed on Feb. 15, 2010, provisional application No. 61/371,360, filed on Aug. 6, 2010, provisional application No. 61/377,599, filed on Aug. 27, 2010, provisional application No. 61/387,164, filed on Sep. 28, 2010.

(51) Int. Cl.
*B32B 15/08* (2006.01)
*B32B 15/02* (2006.01)
(Continued)

(52) U.S. Cl.
CPC ............. *B32B 15/08* (2013.01); *B32B 15/02* (2013.01); *B32B 15/18* (2013.01); *B32B 27/06* (2013.01);
(Continued)

(58) Field of Classification Search
CPC ........ B32B 15/08; B32B 15/02; B32B 15/15; B32B 15/18; B32B 27/20; B32B 27/32; B32B 27/34; B32B 27/06; B32B 2250/03; B32B 2250/40; B32B 2605/00; Y10T 428/12444; Y10T 428/256; Y10T 428/31681; Y10T 428/31605; Y10T 428/31507; Y10T 428/31692; Y10T 428/31696; Y10T 428/249951; Y10T 428/31678; C08J 5/041; C08J 5/10; C08K 7/06

USPC ............. 428/457, 458, 450, 213, 215, 300.7, 428/301.1

See application file for complete search history.

(56) References Cited

U.S. PATENT DOCUMENTS

| 213,015 A | 3/1879 | Wahl et al. |
|---|---|---|
| 777,656 A | 12/1904 | Banning |

(Continued)

FOREIGN PATENT DOCUMENTS

| CA | 2700549 A1 | 4/2009 |
|---|---|---|
| CH | 284305 | 7/1952 |

(Continued)

OTHER PUBLICATIONS

"Estimation of the Volume Resistivity of Electrically Conductive Composites" Weber, Mark and Musa R. Kamal, Polymer Composites (Dec. 1997) vol. 18, No. 6 , pp. 711-725.*

(Continued)

*Primary Examiner* — Kevin R Kruer
(74) *Attorney, Agent, or Firm* — The Dobrusin Law Firm, P.C.

(57) ABSTRACT

The present invention relates to filled polymeric materials including a polymer and a mass of metallic fibers distributed within the polymer, and to light weight composites which comprise at least a pair of metallic layers and a polymeric layer interposed between the pair of metallic layers, the polymeric layer containing the filled polymeric material. The composite materials of the present invention may be formed using conventional stamping equipment at ambient temperatures. Composite materials of the present invention may also be capable of being welded to other metal materials using a resistance welding process such as resistance spot welding. Preferred composite materials include one or any combination of the following features: metallic fibers that are ribbon fibers; a polymer selected from a polyolefin, a polyamide, or a combination thereof; or a metallic layer (e.g., one or both of the pair of metallic layers) having a surface facing the filled polymeric material that is untreated.

16 Claims, 2 Drawing Sheets

(51) Int. Cl.

| | | |
|---|---|---|
| *B32B 15/18* | (2006.01) | |
| *B32B 27/20* | (2006.01) | |
| *B32B 27/32* | (2006.01) | |
| *B32B 27/34* | (2006.01) | |
| *C08J 5/04* | (2006.01) | |
| *C08J 5/10* | (2006.01) | |
| *C08K 7/06* | (2006.01) | |
| *B32B 27/06* | (2006.01) | |

(52) U.S. Cl.
CPC ............... *B32B 27/20* (2013.01); *B32B 27/32* (2013.01); *B32B 27/34* (2013.01); *C08J 5/041* (2013.01); *C08J 5/10* (2013.01); *C08K 7/06* (2013.01); *B32B 2250/03* (2013.01); *B32B 2250/40* (2013.01); *B32B 2605/00* (2013.01); *Y10T 428/12444* (2015.01); *Y10T 428/2495* (2015.01); *Y10T 428/249951* (2015.04); *Y10T 428/256* (2015.01); *Y10T 428/31507* (2015.04); *Y10T 428/31605* (2015.04); *Y10T 428/31678* (2015.04); *Y10T 428/31681* (2015.04); *Y10T 428/31692* (2015.04); *Y10T 428/31696* (2015.04)

(56) References Cited

U.S. PATENT DOCUMENTS

| | | | |
|---|---|---|---|
| 1,972,835 A | 9/1934 | Tainton | |
| 2,286,980 A | 6/1942 | Schanz | |
| 3,086,899 A | 4/1963 | Smith et al. | |
| 3,112,213 A | 11/1963 | Lusa | |
| 3,205,337 A | 9/1965 | Hiemenz | |
| 3,527,667 A | 9/1970 | Larsen et al. | |
| 3,764,277 A | 10/1973 | Hollis | |
| 3,832,433 A * | 8/1974 | Schaffer et al. | 264/143 |
| 3,900,651 A | 8/1975 | Hoppe et al. | |
| 3,969,868 A | 7/1976 | Bainter et al. | |
| 4,037,073 A | 7/1977 | Becker | |
| 4,048,355 A | 9/1977 | Sakayori et al. | |
| 4,110,117 A | 8/1978 | McLeod | |
| 4,110,505 A | 8/1978 | Prewo | |
| 4,171,394 A | 10/1979 | Patil et al. | |
| 4,229,504 A * | 10/1980 | Brachman | 428/461 |
| 4,255,482 A | 3/1981 | Udagawa | |
| 4,267,679 A | 5/1981 | Thompson | |
| 4,313,996 A * | 2/1982 | Newman et al. | 428/215 |
| 4,329,561 A | 5/1982 | Schafer et al. | |
| 4,330,587 A | 5/1982 | Woodbrey | |
| 4,353,951 A | 10/1982 | Yukitoshi et al. | |
| 4,369,222 A | 1/1983 | Hedrick et al. | |
| 4,369,830 A * | 1/1983 | Generali | 164/137 |
| 4,383,942 A * | 5/1983 | Davenport | 252/512 |
| 4,421,892 A | 12/1983 | Kasahara et al. | |
| 4,424,254 A * | 1/1984 | Hedrick et al. | 428/215 |
| 4,429,076 A | 1/1984 | Saito et al. | |
| 4,461,665 A | 7/1984 | Schertler | |
| 4,474,685 A * | 10/1984 | Annis | 252/503 |
| 4,482,600 A | 11/1984 | Matsumoto et al. | |
| 4,513,033 A | 4/1985 | Patil et al. | |
| 4,522,875 A | 6/1985 | Still, Jr. et al. | |
| 4,601,941 A * | 7/1986 | Lutz et al. | 428/213 |
| 4,617,231 A | 10/1986 | Hamada et al. | |
| 4,650,723 A | 3/1987 | Furuya | |
| 4,650,951 A | 3/1987 | Koga et al. | |
| 4,668,545 A | 5/1987 | Lowe | |
| 4,678,699 A | 7/1987 | Gregor et al. | |
| 4,678,707 A | 7/1987 | Shinozaki et al. | |
| 4,690,856 A | 9/1987 | Ito et al. | |
| 4,749,623 A * | 6/1988 | Endo et al. | 428/551 |
| 4,753,850 A | 6/1988 | Ibe et al. | |
| 4,758,627 A | 7/1988 | Wilkus et al. | |
| 4,759,972 A | 7/1988 | Yoshiga et al. | |
| 4,759,994 A | 7/1988 | Lesourd | |
| 4,788,099 A | 11/1988 | Fukushima et al. | |
| 4,792,499 A | 12/1988 | Shindou et al. | |
| 4,794,050 A | 12/1988 | Campbell et al. | |
| 4,857,377 A | 8/1989 | Daimon et al. | |
| 4,873,149 A | 10/1989 | Shinoda et al. | |
| 4,888,247 A | 12/1989 | Zweben et al. | |
| 4,937,125 A | 6/1990 | Lepoetre et al. | |
| 4,942,193 A * | 7/1990 | Van Buskirk et al. | 524/276 |
| 4,978,582 A | 12/1990 | Stamm et al. | |
| 5,030,488 A | 7/1991 | Sobolev | |
| 5,030,816 A | 7/1991 | Strecker | |
| 5,047,479 A | 9/1991 | Ohmae et al. | |
| 5,061,778 A | 10/1991 | Uchida et al. | |
| 5,063,098 A | 11/1991 | Niwa et al. | |
| 5,084,357 A | 1/1992 | Imai et al. | |
| 5,093,204 A | 3/1992 | Watanabe et al. | |
| 5,100,737 A | 3/1992 | Colombier et al. | |
| 5,176,852 A * | 1/1993 | Kondo | C09J 151/06 252/510 |
| 5,216,075 A | 6/1993 | Papazoglou | |
| 5,219,629 A | 6/1993 | Sobolev | |
| 5,227,216 A | 7/1993 | Pettit | |
| 5,278,231 A | 1/1994 | Chundury | |
| 5,347,099 A | 9/1994 | Gissinger et al. | |
| 5,354,607 A | 10/1994 | Swift et al. | |
| 5,410,133 A | 4/1995 | Matsein et al. | |
| 5,418,073 A | 5/1995 | Loth et al. | |
| 5,489,180 A | 2/1996 | Ichihara et al. | |
| 5,518,836 A * | 5/1996 | McCullough | 429/94 |
| 5,548,027 A | 8/1996 | Heucher et al. | |
| 5,578,384 A | 11/1996 | Kingston | |
| 5,604,033 A | 2/1997 | Arthurs et al. | |
| 5,679,441 A | 10/1997 | Saelens et al. | |
| 5,691,037 A | 11/1997 | McCutcheon et al. | |
| 5,753,885 A | 5/1998 | Iwasa et al. | |
| 5,778,813 A | 7/1998 | Kennedy | |
| 5,846,461 A | 12/1998 | Collins et al. | |
| 5,866,215 A | 2/1999 | Karbhari | |
| 5,866,868 A | 2/1999 | Hirane | |
| 5,894,045 A | 4/1999 | Desrondiers | |
| 5,916,469 A | 6/1999 | Scoles et al. | |
| 5,939,213 A | 8/1999 | Bowden et al. | |
| 5,939,512 A | 8/1999 | Gervasi et al. | |
| 5,951,800 A | 9/1999 | Pettit | |
| 6,004,650 A | 12/1999 | Schweizer | |
| 6,012,493 A | 1/2000 | Remke et al. | |
| 6,050,208 A | 4/2000 | Kennedy | |
| 6,090,465 A | 7/2000 | Steele et al. | |
| 6,099,055 A | 8/2000 | Hirota et al. | |
| 6,126,865 A | 10/2000 | Haak et al. | |
| 6,138,435 A | 10/2000 | Kocher et al. | |
| 6,146,488 A | 11/2000 | Okada et al. | |
| 6,177,173 B1 | 1/2001 | Nelson | |
| 6,202,462 B1 | 3/2001 | Hansen et al. | |
| 6,268,408 B1 | 7/2001 | Dispenza | |
| 6,294,257 B1 * | 9/2001 | Tsukakoshi et al. | 428/400 |
| 6,346,292 B1 | 2/2002 | Grubb et al. | |
| 6,346,491 B1 | 2/2002 | DeAngelis et al. | |
| 6,387,535 B1 * | 5/2002 | Mantel | 428/608 |
| 6,428,905 B1 | 8/2002 | Behr et al. | |
| 6,455,148 B1 | 9/2002 | Spears et al. | |
| 6,465,110 B1 | 10/2002 | Boss et al. | |
| 6,534,194 B2 | 3/2003 | Weihs et al. | |
| 6,592,968 B1 | 7/2003 | Schmit et al. | |
| 6,592,979 B1 | 7/2003 | DeTeresa | |
| 6,659,518 B2 | 12/2003 | Ponsonnaille et al. | |
| 6,673,468 B1 | 1/2004 | Behr et al. | |
| 6,741,221 B2 | 5/2004 | Aisenbrey | |
| 6,764,772 B2 * | 7/2004 | Clyne et al. | 428/567 |
| 6,841,212 B2 | 1/2005 | Bicakci-Jenkins et al. | |
| 6,841,252 B2 | 1/2005 | Kroes et al. | |
| 6,861,156 B2 | 3/2005 | Palm | |
| 6,865,805 B2 | 3/2005 | Dispenza et al. | |
| 6,870,516 B2 | 3/2005 | Aisenbrey | |
| 7,157,140 B1 | 1/2007 | Hoppe et al. | |
| 7,261,932 B2 | 8/2007 | Kennedy | |
| 7,316,838 B2 | 1/2008 | Aisenbrey | |
| 7,459,115 B2 | 12/2008 | Stadler et al. | |
| 7,553,553 B2 | 6/2009 | Palumbo | |
| 7,569,624 B2 | 8/2009 | Kolbe et al. | |

(56) References Cited

U.S. PATENT DOCUMENTS

| | | |
|---|---|---|
| 7,592,388 B2 | 9/2009 | Wick et al. |
| 7,648,058 B2 | 1/2010 | Straza |
| 7,748,184 B1 | 7/2010 | Wheeler et al. |
| 7,833,630 B2 | 11/2010 | Sigler |
| 7,879,454 B2 | 2/2011 | Manicke |
| 7,927,708 B2 | 4/2011 | Mizrahi |
| 7,959,058 B1 | 6/2011 | Crane |
| 7,981,501 B2 | 7/2011 | Kwag et al. |
| 8,034,428 B2 | 10/2011 | Verhaeghe |
| 8,071,205 B2 | 12/2011 | Tsuchiya |
| 8,186,566 B2 | 5/2012 | Abramovici et al. |
| 8,216,658 B2 | 7/2012 | Rajabali |
| 8,308,225 B2 | 11/2012 | Owen et al. |
| 8,309,004 B2 | 11/2012 | Pinard |
| 8,328,971 B2 | 12/2012 | Kia et al. |
| 8,344,070 B2 | 1/2013 | Squire et al. |
| 8,397,976 B2 | 3/2013 | Abramovici et al. |
| 8,404,352 B2 | 3/2013 | Schwab et al. |
| 8,475,930 B2 | 7/2013 | Shoji et al. |
| 8,518,521 B2 | 8/2013 | Aso et al. |
| 8,573,357 B1 | 11/2013 | Hibbs |
| 8,852,733 B2 | 10/2014 | Kwag et al. |
| 8,888,169 B2 | 11/2014 | Howe et al. |
| 8,889,263 B2 | 11/2014 | Rice |
| 9,115,264 B2* | 8/2015 | Mizrahi ............... B32B 15/02 |
| 2002/0108678 A1 | 8/2002 | Montano et al. |
| 2002/0160180 A1 | 10/2002 | Yamato et al. |
| 2003/0064241 A1 | 4/2003 | Suzuki et al. |
| 2003/0082335 A1 | 5/2003 | Clyne et al. |
| 2003/0099857 A1 | 5/2003 | Nomura et al. |
| 2003/0162049 A1 | 8/2003 | Muijnck et al. |
| 2004/0116602 A1 | 6/2004 | Botros |
| 2004/0222863 A1 | 11/2004 | Aisenbrey |
| 2004/0227688 A1 | 11/2004 | Aisenbrey |
| 2004/0233112 A1 | 11/2004 | Aisenbrey |
| 2004/0239578 A1 | 12/2004 | Aisenbrey |
| 2004/0244789 A1 | 12/2004 | Jentgens |
| 2004/0247927 A1 | 12/2004 | Kurz |
| 2005/0000947 A1 | 1/2005 | Sigler et al. |
| 2005/0001780 A1 | 1/2005 | Aisenbrey |
| 2005/0133575 A1 | 6/2005 | Gayden et al. |
| 2005/0140042 A1 | 6/2005 | Aisenbrey |
| 2005/0166956 A1 | 8/2005 | Aisenbrey |
| 2005/0181203 A1 | 8/2005 | Rawlings et al. |
| 2005/0204544 A1 | 9/2005 | Aisenbrey |
| 2005/0205712 A1 | 9/2005 | Aisenbrey |
| 2005/0206270 A1 | 9/2005 | Aisenbrey |
| 2005/0206289 A1 | 9/2005 | Aisenbrey |
| 2005/0206491 A1 | 9/2005 | Aisenbrey |
| 2005/0208251 A1 | 9/2005 | Aisenbrey |
| 2005/0208862 A1 | 9/2005 | Aisenbrey |
| 2005/0212161 A1 | 9/2005 | Aisenbrey |
| 2005/0212162 A1 | 9/2005 | Aisenbrey |
| 2005/0214553 A1 | 9/2005 | Yannetti et al. |
| 2005/0224280 A1 | 10/2005 | Aisenbrey |
| 2005/0271859 A1 | 12/2005 | Tuss |
| 2006/0003667 A1 | 1/2006 | Aisenbrey |
| 2006/0010807 A1 | 1/2006 | Whitley |
| 2006/0060296 A1 | 3/2006 | Sigler et al. |
| 2006/0060690 A1 | 3/2006 | Aisenbrey |
| 2006/0062977 A1 | 3/2006 | Sigler et al. |
| 2006/0071862 A1 | 4/2006 | Aisenbrey |
| 2006/0091887 A1 | 5/2006 | Aisenbrey |
| 2006/0134395 A1 | 6/2006 | Sigler et al. |
| 2006/0134449 A1 | 6/2006 | Sigler et al. |
| 2006/0134450 A1 | 6/2006 | Sigler et al. |
| 2006/0222869 A1 | 10/2006 | Cai et al. |
| 2006/0269701 A1* | 11/2006 | Gauriat et al. ............... 428/31 |
| 2006/0269738 A1 | 11/2006 | Kimberly |
| 2006/0286333 A1 | 12/2006 | Wang et al. |
| 2007/0062758 A1 | 3/2007 | Jensen et al. |
| 2007/0104966 A1 | 5/2007 | Calvez et al. |
| 2007/0186614 A1 | 8/2007 | Pinard |
| 2007/0187469 A1 | 8/2007 | Chen et al. |
| 2007/0196637 A1* | 8/2007 | Good et al. ............... 428/297.4 |
| 2007/0295704 A1 | 12/2007 | Sigler et al. |
| 2008/0012389 A1 | 1/2008 | Mittermeier et al. |
| 2008/0032094 A1 | 2/2008 | Raghavendran |
| 2008/0036241 A1 | 2/2008 | Aisenbrey |
| 2008/0036251 A1 | 2/2008 | Aisenbery |
| 2008/0081149 A1 | 4/2008 | Fuerst et al. |
| 2008/0254310 A1 | 10/2008 | Palumbo et al. |
| 2008/0311363 A1 | 12/2008 | Haskett et al. |
| 2009/0020187 A1* | 1/2009 | Russell et al. ............... 148/281 |
| 2009/0142538 A1 | 6/2009 | Sigler et al. |
| 2009/0159034 A1 | 6/2009 | Katayama et al. |
| 2009/0226755 A1 | 9/2009 | Sigler et al. |
| 2009/0280348 A1 | 11/2009 | Patberg et al. |
| 2010/0035080 A1 | 2/2010 | Sigler et al. |
| 2010/0084380 A1 | 4/2010 | Tezlaff et al. |
| 2010/0098929 A1 | 4/2010 | Dispenza |
| 2010/0196736 A1 | 8/2010 | Boger et al. |
| 2010/0233505 A1 | 9/2010 | Boger et al. |
| 2011/0052910 A1 | 3/2011 | Gunnink |
| 2012/0196138 A1 | 8/2012 | Botros et al. |
| 2013/0136944 A1 | 5/2013 | Mizrahi et al. |
| 2014/0034233 A1 | 2/2014 | VanSweden et al. |
| 2014/0162086 A1 | 6/2014 | Mizrahi |

FOREIGN PATENT DOCUMENTS

| | | |
|---|---|---|
| CH | 287794 | 12/1952 |
| CH | 406580 | 1/1966 |
| CN | 1649724 A | 8/2005 |
| DE | 877057 | 5/1953 |
| DE | 1912948 | 10/1970 |
| DE | 1729057 | 6/1971 |
| DE | 3622781 A1 | 1/1988 |
| DE | 4019202 A1 | 12/1991 |
| DE | 4141343 A1 | 5/1993 |
| DE | 4307563 A1 | 9/1993 |
| DE | 4300283 A1 | 7/1994 |
| DE | 19633306 A1 | 10/1997 |
| DE | 19724361 A1 | 1/1998 |
| DE | 19740844 A1 | 3/1999 |
| DE | 19810706 A1 | 9/1999 |
| DE | 19919783 | 11/2000 |
| DE | 19926379 A1 | 12/2000 |
| DE | 10011589 A1 | 9/2001 |
| DE | 10240384 A1 | 3/2004 |
| DE | 102004022677 A1 | 5/2004 |
| DE | 202004015784 | 4/2005 |
| DE | 102006013529 A1 | 10/2006 |
| DE | 102006049014 A1 | 4/2008 |
| DE | 102006049015 A1 | 4/2008 |
| DE | 102012103793 A | 10/2013 |
| EP | 19835 A1 | 12/1980 |
| EP | 0069401 | 1/1983 |
| EP | 0032355 B1 | 5/1984 |
| EP | 0208443 | 6/1986 |
| EP | 0249442 A2 | 12/1987 |
| EP | 0311722 A1 | 4/1989 |
| EP | 0322947 B1 | 7/1989 |
| EP | 0335642 A2 | 10/1989 |
| EP | 0354521 A2 | 2/1990 |
| EP | 0356837 B1 | 3/1990 |
| EP | 0642920 A2 | 3/1995 |
| EP | 888880 A1 | 1/1999 |
| EP | 1034920 | 9/2000 |
| EP | 1044796 A2 | 10/2000 |
| EP | 1095718 A1 | 5/2001 |
| EP | 1197323 A1 | 4/2002 |
| EP | 1491328 A1 | 12/2004 |
| EP | 1504892 A1 | 2/2005 |
| FR | 1245009 | 11/1960 |
| GB | 2062057 A | 5/1981 |
| GB | 2332875 A | 7/1999 |
| JP | 54-52182 A | 4/1979 |
| JP | 56132709 A | 10/1981 |
| JP | S57-34949 A | 2/1982 |
| JP | 58-142844 A | 8/1983 |
| JP | 58-142845 A | 8/1983 |
| JP | S58-142845 A | 8/1983 |
| JP | 58/180037 A | 10/1983 |

(56) References Cited

FOREIGN PATENT DOCUMENTS

| | | |
|---|---|---|
| JP | 58-180037 | 12/1983 |
| JP | S58-180037 U | 12/1983 |
| JP | 60-201296 A | 10/1985 |
| JP | 61010445 A | 1/1986 |
| JP | S61010445 A | 1/1986 |
| JP | 61029262 U | 7/1986 |
| JP | S63-242536 A | 10/1986 |
| JP | 61-290044 A | 12/1986 |
| JP | 62-151332 A | 7/1987 |
| JP | S62-187022 | 8/1987 |
| JP | 63-027248 A | 2/1988 |
| JP | S63-193831 | 8/1988 |
| JP | 63242536 A | 10/1988 |
| JP | H01-108207 A | 4/1989 |
| JP | 01154876 A1 | 6/1989 |
| JP | 01-263043 A | 10/1989 |
| JP | 2050827 A | 2/1990 |
| JP | 02-297432 | 7/1990 |
| JP | H02-297432 A | 7/1990 |
| JP | 02-231134 A | 9/1990 |
| JP | 2297432 A | 12/1990 |
| JP | 03-193443 A | 8/1991 |
| JP | 04-077245 A | 3/1992 |
| JP | 04-094928 A | 3/1992 |
| JP | 04-127972 A | 4/1992 |
| JP | 04-282239 A | 7/1992 |
| JP | 05-039560 A | 2/1993 |
| JP | 05-039561 A | 2/1993 |
| JP | 5050553 A | 3/1993 |
| JP | 05-138802 A | 6/1993 |
| JP | 5-162237 A | 6/1993 |
| JP | 05-229054 A | 9/1993 |
| JP | 05-229055 A | 9/1993 |
| JP | 06-071806 A | 3/1994 |
| JP | 06-198802 A | 7/1994 |
| JP | 07-068701 A | 3/1995 |
| JP | 07-276557 A | 10/1995 |
| JP | 08-224827 A | 9/1996 |
| JP | 09-087528 A | 3/1997 |
| JP | 63-158242 A | 7/1998 |
| JP | 10-237313 A | 9/1998 |
| JP | 11-123790 | 5/1999 |
| JP | H11-123790 A | 5/1999 |
| JP | 2000-263697 A | 9/2000 |
| JP | 2001-059187 | 3/2001 |
| JP | 2001192792 A | 7/2001 |
| JP | 2013-515613 A | 5/2013 |
| JP | 2013-519543 A | 5/2013 |
| NL | 8203423 A | 4/1984 |
| RU | 2149788 C1 | 5/2000 |
| WO | 95/27975 A1 | 10/1995 |
| WO | 99/29492 | 6/1999 |
| WO | 99/29492 A1 | 6/1999 |
| WO | 99/46461 A1 | 9/1999 |
| WO | 00/13892 A1 | 3/2000 |
| WO | 03/037970 A1 | 5/2003 |
| WO | 2007/061304 A1 | 5/2007 |
| WO | 2007/062061 A2 | 5/2007 |
| WO | 2008/118694 A1 | 10/2008 |
| WO | 2009/027480 A1 | 3/2009 |
| WO | 2009/043777 A2 | 4/2009 |
| WO | 2009/135786 A1 | 11/2009 |
| WO | 2010/021899 A1 | 2/2010 |
| WO | 2012/126923 | 9/2012 |
| WO | 2013/062642 | 5/2013 |
| WO | 2013/156166 | 10/2013 |
| WO | 2013/164173 | 11/2013 |

OTHER PUBLICATIONS

Kim et al., "Forming and Failure Behaviour of Coated, Laminated and Sandwiched Sheet Metals: A Review", J. of Mat. Processing Tech., 63 (1997) 38-42.
Mohr et al. Development of Formable Sandwich Seets for Automotive Applications, Adv. Eng. Materials, 7 (2005) 243-246.
Kim et al., "Formability of AA5182/polypropylene/AA5182 Sandwhich Sheets", J. of Mat. Processing Tech., 139 (2003) 1-7.
Weiss et al. "The Influence on Temperature on the Forming Behavior of Metal/Polymer Laminates in Sheet Metal Forming", Transactions of the ASME, 129 ( 2007) 530-537.
Shinozaki et al. "Spot-Weldable Composite Damping Sheets" www.jfe-steel.co.jp/archives/ksc_giho/16-4/j16-288-295.pdf.
PCT International Search Report, PCT/US2009/053676, Productive Research LLC, mailed Dec. 23, 2009.
"The Effect of Electrical Resistance on Nugget Formation During Spot Welding", J.G. Kaiser, G.J. Dunn, and T.W. Eagar, Welding Research Supplement, Jun. 1982, pp. 167-s to 174-s.
PCT International Search Report, PCT/US2010/062138, Productive Research LLC, mailed Mar. 18, 2011.
PCT International Search Report, PCT/US2011/024829, Productive Research LLC, mailed May 10, 2011.
Co-Pending U.S. Appl. No. 12/978,974, filed Dec. 27, 2010 by Mizrahi et al.
Co-Pending U.S. Appl. No. 13/052,292, filed Mar. 21, 2011 by Mizrahi.
Gunnink, J.W. GLARE: An Improved Damage Tolerance Material. Proc. 19th European Conference on materials for Aerospace Applications, Dec. 6-8, 2000, pp. 17-24.
www.quietsteel.com/pressrelease-022003.html, MSC Engineered Materials and Solutions Group, "Quiet Steel™ Debuts on 2003 Cadillac (Feb. 20, 2003)".
Abstract for: Dunnand, M., et al., "USILIGHT: A cost effective solution to lighten cars", SAE Technical Paper Series, Apr. 3-6, 2006, pp. 1-10.
Abstract for: Murase, M., et al., "Development of vibration damping steel sheets for automobile oil pans", SAE Internation Congress and Exposition, Mar. 1-5, 1993; Paper No. 930023; Kawasaki Steel Corp.
Abstract for: Shimizu, T. et al., "Application of hot-dip Zn-6%Al-3%Mg Alloy Coated Steel Sheet to Automotive Body", SAE Technical Paper No. 2005-01-1330, SAE 2005 World Congress & Exhibition, Apr. 2005.
Abstract for: Herrschaft, D. et al., "Galfan—A New Zinc-Alloy Coated Steel for Automotive Body Use", SAE Technical Paper 830517, 1983.
Abstract for: Guttman, H., et al. "Galfan—A new Coating for Automotive Tubing", SAE Technical Paper 860274, 1986.
Abstract for: Welch, T. et al., "Cost and Performance Benefits for Laminated Steel Body", SAE Technical Paper 1999-01-1784, 1999.
Office Action from the US Patent Office for copending U.S. Appl. No. 13/052,292 dated Nov. 23, 2011.
PCT International Search Report, PCT/US2011/046778, Productive Research LLC, mailed Nov. 10, 2011 for co-pending patent application.
Co-pending PCT patent application No. PCT/US2011/046778 filed on Aug. 5, 2011 and published as WO 2012/019115 A1 on Feb. 9, 2012 by Mizrahi et al.
Co-pending U.S. Appl. No. 13/399,459, filed Feb. 17, 2012 by Mizrahi et al.
Office Action from the U.S. Patent Office for co-pending U.S. Appl. No. 12/978,974 mailed on Jan. 24, 2012.
Office Action from the US Patent Office for co-pending U.S. Appl. No. 13/052,292 mailed on Apr. 19, 2012.
Office Action from the U.S. Patent Office dated Jun. 5, 2012 for co-pending U.S. Appl. No. 12/978,974.
International search report for copending PCT Patent Application PCT/US2012/025619 filed on Feb. 17, 2012 and mailed on May 29, 2012.
Copending PCT Patent Application PCT/US2012/025619 filed on Feb. 17, 2012.
Office Action from the US Patent Office for co-pending U.S. Appl. No. 13/052,292 mailed on Oct. 16, 2012.
Japanese Office Action, Application No. 2011-523874 dated Apr. 24, 2013.
Office Action, dated Mar. 25, 2013 for co-pending U.S. Appl. No. 12/978,974.

(56) References Cited

OTHER PUBLICATIONS

Japanese Office Action dated Apr. 24, 2013 for co-pending Japanese Patent Application No. 2011-523874 with summary of the novelty and inventive step rejections prepared by Kiyohara & Co Patent Attorney dated May 22, 2013.
Link, Todd M. "Formability and Performance of Steel-Plastic Steel Laminated Sheet Materials", SAE 2001 World Congress, Detroit, MI, Mar. 5-8, 2001.
Miller, William K. "Metal-Plastic Laminates for Vehicle Weight Reduction," SAE Congress and Exposition, Detroit, MI, Feb. 25-29, 1980.
McKenna, L.W. et al., "New Light-Weight Materials for Vehicle Body Panels—Aluminum/Nylon Laminates," SAE Congress and Exposition, Detroit, MI, Feb. 25-29, 1980.
DiCello, J.A., "Steel-Polypropylene-Steel Laminate—A New Weight Reduction Material," SAE Congress and Exposition, Detroit, MI, Feb. 25-29, 1980.
Haward, R.N., "Strain Hardening of Thermoplastics," Macromolecules 1993, 26, 5860-5869.
Markaki, A.E. and T.W. Clyne, "Mechanics of Thin Ultra-Light Stainless Steel Sandwich Sheet Material, Part I. Stiffness," Acta Materialia 51 (2003) 1341-1350.
Markaki, A.E. and T.W. Clyne, "Mechanics of Thin Ultra-Light Stainless Steel Sandwich Sheet Material, Part II. Resistance to Delamination," Acta Materialia 51 (2003) 1351-1357.
Markaki, A.E., S.A. Westgate, and T.W. Clyne, "The Stiffness and Weldability of an Ultra-Light Steel Sandwich shhet Maerial with a Fibrous Metal Core," In Processing and Properties of Lightweight Cellular Metals and Structures, TMS, 2002, pp. 15-24.
Mohr, Dirk, "On the Role of Shear Strength in Sandwich Sheet Forming," International Journal of Solids and Structures 42 (2005) 1491-1512.
Sokolova, O. et al, "Metal-polymer-metal sandwiches with local metal reinforcements: A study on formability by deep drawing and bending," Composite Structures, 94 (2011) 1-7.
Shelley, Tom, "Steel Makes Lightweight Fibre Sandwich," Sep. 2001. Downloaded from http://fplreflib.findlay.co.uk/articles/1311/n-sandwich.htm on Jun. 3, 2013.
Weiss, M. et al., "Elastic Bending of Steel-Polymer-Steel Laminates (SPS) to a Constant Curvature," Journal of Applied Mechanics (ASME), 2006. 73 (4): p. 574-579.
Office Action from the U.S. Patent Office for copending U.S. Appl. No. 12/978,974 mailed on Mar. 25, 2013.
Office Action from the U.S. Patent Office for copending U.S. Appl. No. 12/978,974 mailed on Aug. 8, 2013.
Office Action dated Dec. 17, 2013 for copending U.S. Appl. No. 12/978,974.
Second Chinese Office Action dated Jan. 15, 2015, Application No. 201180019208.2.
Japanese Office Action dated Jan. 20, 2014, Application No. 2012-553092.
Chinese Office Action dated Sep. 18, 2014, Application No. 201080064854.6.
Japanese Office Action dated Dec. 22, 2014, Application No. 2012-546253.
Office Action Summary dated Jun. 12, 2014, U.S. Appl. No. 13/939,666.
Japanese Office Action dated Mar. 30, 2015, Application No. 2013-523364.
Office Action from the U.S. Patent Office for co-pending U.S. Appl. No. 13/939,666 mailed on Mar. 11, 2015.
Advisory Action dated May 26, 2015; U.S. Appl. No. 13/939,666.
Office Action from the Japan Patent Office for JP Application No. 2011-523874 dated Jun. 16, 2014.
Office Action from the European Patent Office for Europe Patent Application No. 11748818.9 mailed Oct. 2, 2014.
Office Action form the European Patent Office for EP application No. 11748818.9 dated Jul. 2, 2015.
Office Action dated Jan. 13, 2015 for copending U.S. Appl. No. 13/814,352.
Office Action from the Japanese Patent Office for Japanese Patent Application No. 2013-523364 mailed Mar. 30, 2015.
Office Action from the Korean Patent Office for KR 10-2011-7006179 dated Nov. 26, 2015.
Office Action from the Japanese Patent Office for Japanese Patent Application No. 2013-523364 mailed Jan. 6, 2016.

* cited by examiner

FORMABLE LIGHT WEIGHT COMPOSITE MATERIAL SYSTEMS AND METHODS

CLAIM OF BENEFIT OF FILING DATE

The present invention claims the benefit of the filing date of U.S. Provisional Patent Application Nos. 61/304,640 (filed by Mizrahi et al. on Feb. 15, 2010), 61/371,360 (filed by Mizrahi et al. on Aug. 6, 2010), 61/377,599 (filed by Mizrahi on Aug. 27, 2010), and 61/387,164 (filed by Mizrahi on Sep. 28, 2010), the contents of which are hereby incorporated by reference in their entirety.

FIELD OF THE INVENTION

The present invention relates generally to fiber-filled polymeric materials, and to composite materials that include a layer of the fiber-filled polymeric material, and more particularly to sandwich composites that include a layer of the fiber-filled polymeric material and a metallic layer.

BACKGROUND

In International Patent Application Publication WO 2010/021899 (published on Feb. 25, 2010 by Mizrahi, and incorporated herein by reference in its entirety), there are described unique and new light weight composite materials and associated methods and systems. Such composites have widespread application across a range of technologies. For example, it is described as having particular application as a transportation technology (e.g., an automotive technology). It may also have other applications, such as a construction technology or as an appliance technology. Unfortunately cost and performance requirements vary from technological field to technological field, or even between different applications within a technological field, so the ability to have a "one size fits all" material system is a difficult proposition. Accordingly, notwithstanding the various teachings of International Patent Application Publication WO 2010/021899, it is still attractive to explore variations in material systems, for enhancing the commercial attractiveness of composite materials, such as sandwich type composite laminates. Moreover, for some applications it may be attractive to tune the performance of various composite materials, such as the materials of WO 2010/021899, so that they have relatively broad processing windows, so that they exhibit weldability, so that they exhibit drawability, so that they can be coated, and/or so that they otherwise can take the place of conventional materials (e.g., steel) for various applications, and at the same time provide appreciable weight savings relative to the conventional material. By way of example, in the transportation industry there remains a need for relatively lightweight materials alternative to steel, aluminum or both for vehicle components (such as panels, support members or the like).

SUMMARY OF THE INVENTION

The present teachings are directed to sandwich laminate material systems. In one particular aspect, the teachings find particular application as an improved automotive technology system that can be used in combination with, or even as a substitute for many of the traditional metal applications, while affording potentially substantial weight savings (e.g., at least about 10%, 20%, 30% or more as compared with the same application in which a conventional material (e.g., steel) is ordinarily used. As will be appreciated, while the teachings emphasize use in automotive technologies, they find use in others.

In general, the teachings herein pertain to a filled polymeric material (and composites such as sandwich composites that incorporate the filled polymeric material), comprising: a thermoplastic polymer, the thermoplastic polymer selected from the group consisting of a polyolefin, an acetal copolymer, a polyamide, a polyamide copolymer (such as a polyamide copolymer including at least two amide monomers and/or a polyamide copolymer including at least one monomer that is not an amide), an ionomer, a polyimide, a polyester, a polycarbonate, a thermoplastic polyurethane, a thermoplastic polyether-ester copolymer, an acrylontirile butadiene styrene copolymer, a polystyrene, a copolymer including at least 60 wt. % of an α-olefin and at least one additional monomer, other copolymers including any of these polymers, ionomers including any of these polymers, and any combination thereof; and a plurality of metallic fibers distributed within the polymer, wherein the metallic fibers are present at a concentration greater than about 3% by volume, based on the total volume of the filled polymeric material.

This aspect of the teachings may be further characterized by one of any combination of the following: the thermoplastic material includes a polyolefin (e.g., polypropylene, polyethylene or a combination thereof), an acetal copolymer, a polyamide, a polyamide copolymer, a polyimide, a polyester, a polycarbonate, an acrylontirile butadiene styrene copolymer, a polystyrene, a copolymer including at least 60 wt. % of an α-olefin and at least one additional monomer, copolymers including any of these polymers, or any combination thereof; the thermplastic material includes a polyamide copolymer, a thermoplastic polyurethane, a thermoplastic polyether-ester copolymer, an ionomer, or any combination thereof; the filled polymeric material has a thickness, the fibers are present as a mass of fibers, and the mass of fibers spans the thickness of filled polymeric material; or the thermoplastic material has an elongation at failure of at least about 20% at a tensile strain rate of about $0.1\ s^{-1}$ as measured according to ASTM D638-08.

In one particular aspect of this teaching the polymer may be a polymer selected from a polyolefin, a polyamide, or a combination thereof; the fibers may be in the form of a mass (e.g., an entangled mass) that includes ribbons, such as steel ribbons.

Another aspect of the teachings is directed at a light weight composite comprising: a first metallic layer (e.g., sheet steel); a second metallic layer (e.g., sheet steel); a polymeric layer (e.g., a polymer as described in the above aspects of the teachings) disposed between the first metallic layer and the second metallic layer; and a plurality of metallic fibers distributed within the polymeric layer; wherein the fraction of the metallic fibers that contact a metallic layer along at least half of the length of the fiver is about 0.3 or less; and the polymeric layer includes a filled polymeric material containing a polymer, the polymer having an elongation at failure of at least about 20% at a tensile strain rate of about $0.1\ s^{-1}$ as measured according to ASTM D638-08; so that the resulting composite material may be welded, and so that the resulting composite may be plastically deformed at strain rates greater than about $0.1\ s^{-1}$. As to this aspect of the teachings, the first metallic layer, the second metallic layer, or both may be free of any surface treatment, coating or other layer disposed between it and the polymeric layer (it being appreciated that optionally one or more suitable layers may nonetheless be employed and still be within the general teachings herein).

A method related aspect of the invention is directed at a process of forming a sheet comprising: forming a sheet of a filled thermoplastic polymer as described herein, and monitoring the quality of the sheet. For example, the polymeric layer may be preformed (e.g., as a sheet) and laminated to at least one metallic layer or between opposing metallic layers, such as in a continuous process, a batch process or otherwise.

Still another aspect of the teachings is directed at a process of forming a composite part comprising a step of stamping a composite material, such as described herein.

A further aspect of the teachings is directed at a welded structure including a composite material, such as a composite material described herein, welded to steel (e.g., resistance welded), to a metal other than steel, to a substantially identical composite material, to a different composite material, or any combination thereof. Surprisingly, the light weight composite material may have a polymeric layer including a quantity and an arrangement of metallic fibers sufficient to allow electrical conductivity so that the composite material is capable of being welded (e.g., using conventional equipment and processes of a type used for resistance welding steel in existing vehicle production lines), and yet sufficiently low so that the composite material affords attractive performance characteristics such as a relatively high strength to weight ratio, coatability, reducing the transmission of sound through the material or any combination thereof.

DETAILED DESCRIPTION

Figure 1A:
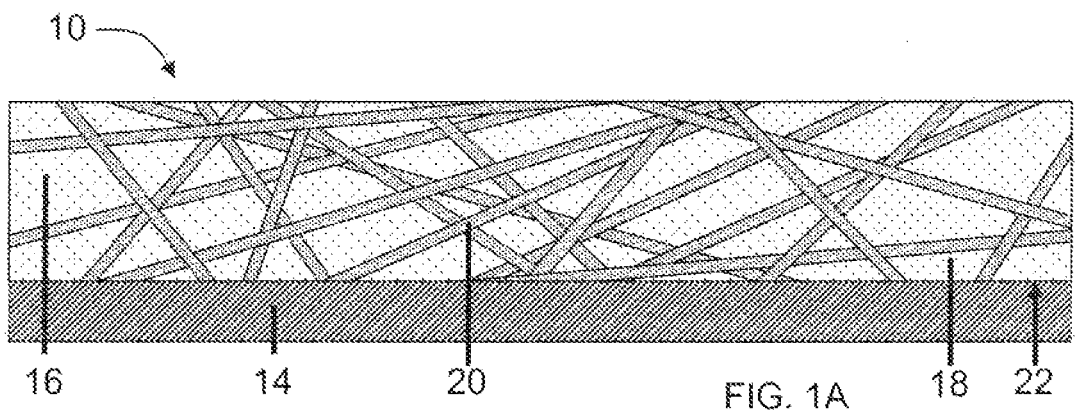
FIG. 1A illustrates a composite material having a polymeric layer and a metallic layer.

In general, the materials herein employ a filled polymeric material, as will be described, and particularly one that includes a metal fiber phase distributed in a polymeric matrix. In general, the composite materials herein employ at least two layers, one of which is the above filled (e.g., fiber-filled) polymeric material (e.g., in a fiber-filled polymeric layer). More particularly, the materials herein are composites that include a sandwich structure, pursuant to which a fiber-filled polymeric layer is sandwiched between two or more other layers. The materials herein also contemplate sandwich structure pre-cursors, e.g., a first layer upon which a filled polymeric layer is attached so that the filled polymeric layer has an exposed outer surface. A second layer may subsequently be attached to the filled polymeric layer. The invention also contemplates feedstock compositions (e.g., in the form of a pellet, a sheet, or otherwise) that include a fiber-filled polymeric material in accordance with the present teachings. As will be illustrated, the materials herein exhibit a unique, surprising, and attractive combination of properties, which render the materials suitable for deforming operations (e.g., relatively high strain rate forming operations, such as stamping), welding operations, or both. For instance, as will be seen from the teachings, the filled polymeric layer is designed in a manner such that is multiphasic. At least one phase (e.g., the filler) provides a conductive flow path, and is such that it is plastically deformable, and may even strain harden when subjected to a stress that induces plastic deformation. In addition, the polymeric phase is such that it bonds sufficiently to another material (e.g., a metal layer such as a steel sheet) that processing of the composite materials for welding and/or deforming (e.g., forming, such as by stamping), will be free of delamination of the composite. The polymeric phase may also be such that it withstands degradation when subjected to coating operations (e.g., when subjected to chemical baths such as electrostatic coating baths, or other baths for imparting corrosion resistance, common in sheet metal coating operations).

The present teachings in their various aspects make use of unique combinations of materials to derive an attractive composite, and particularly a laminate composite. By way of example, without limitation, the laminate may be drawn (e.g., deep drawn), welded, or both, in a manner similar to conventional art-disclosed sheet materials, such as sheet metal (e.g., stainless and/or low carbon steel). In general, the invention makes use of a multi-phase composite material in which the materials are selected and employed so that, as a whole, they impart drawability, weldability, or both. Additionally, the materials are such that the resulting laminates can be processed in a manner similar to conventional art-disclosed thin walled structures particularly as it relates to processes for imparting a decorative or functional surface treatment (e.g., a coating, a plating, or otherwise).

For example, a particular preferred combination of materials herein may include two layers that flank a core material, the latter of which is preferably a filled polymeric material. The filled polymeric material preferably includes at least one polymer, which polymer may include, consist essentially of, or consist entirely of a thermoplastic polymer, or otherwise has characteristics that render it generally processable as a thermoplastic polymer. The filled polymeric material preferably also includes a filler phase, and preferably a phase having a filler that includes, consists essentially of, or consists entirely of a fiber phase, and particularly an elongated fiber phase, such as an elongated metal fiber phase. Such phase may be sufficiently positioned and/or distributed (e.g., wrapped, braided, aligned, entangled, or any combination thereof), and used in sufficient volume that an electrically conductive network across at least portions of the filled polymeric material is realized even if the polymer itself generally is not conductive. A particularly preferred elongated fibrous phase may also itself exhibit elongation (either or both individual fibers or the mass as a whole) and possibly strain hardening.

It should be appreciated that references to "layers" herein do not necessarily require discrete and separate pieces of material. For example, a layered composite may still be within the teachings herein if it includes a single sheet of a material that has been folded over upon itself to define two layers of the material, albeit sharing a common edge, between which is located the filled polymeric material.

Turning now with more particularity to the teachings herein, it is seen that in a first aspect there is contemplated a composite material that is made from layers of adjoining dissimilar materials, which includes at least one layer (e.g., a metal layer such as a metal face layer) and at least one polymeric layer, the composite being formable (e.g., stampable by application of a stress to cause plastic strain (e.g., at a relatively rapid rate) of the material or otherwise capable of being cold-formed on a press machine) into a formed panel. The composite material may be a composite laminate containing one metallic layer and one polymeric layer, or it may include one or more other layers. For example, it may be a laminate including one metallic layer interposed between two polymeric layers, or a laminate including a polymeric layer sandwiched between at least two opposing metallic layers. As indicated, a particularly preferred approach envisions this latter structure, the former structures possibly serving as precursors for the later structure. In such instance the method of forming a sandwich structure may include a step of applying a layer to a precursor to form a sandwich structure, a step of applying a first precursor to a second precursor to form a sandwich structure, or both.

Figure 1B:
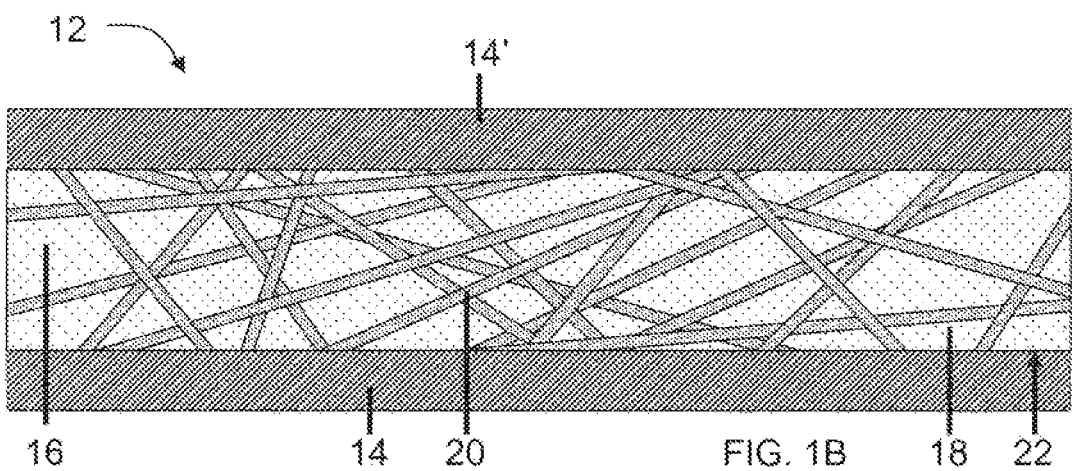
FIG. 1B illustrates a composite material having a polymeric core layer interposed between two metallic layers.

An example of a composite laminate 10 having one metallic layer 14 and one polymeric layer 16 is illustrated in FIG. 1A. A sandwich 12 may contain a first metallic layer 14, a second metallic layer 14' and a polymeric layer 16 (e.g., a polymeric core layer) interposed between the first and second metallic layers, as illustrated in FIG. 1B. Referring to FIGS. 1A and 1B, the polymeric layer 16 includes at least one polymer (e.g., a thermoplastic polymer) 18 and a fiber 20. The polymeric layer 16 and the first metallic layer 14 may have a common surface 22. As illustrated in FIGS. 1A and 1B some or all of the fibers may have a length and orientation such that they extend from one surface of the polymeric layer to the opposing surface of the polymeric layer. However, it will be appreciated that other fiber lengths and orientations are within the scope of the inventions. For example, the fraction of the fibers (e.g., metallic fibers) that extend between the two opposing faces of the polymeric layer may be less than 20%, less than 10%, less than 5%, or less than 1%. The fibers illustrated in FIGS. 1A and 1B are generally straight fibers. It will be appreciated from the teachings herein that preferred fibers are generally not straight. Preferred fibers have one or more bends along a length of the fiber, have a generally curved profile, or both.

As mentioned, in addition to the composite, multi-layered structures, another aspect of the invention contemplates a precursor polymeric layer sheet material (i.e., a single layer of the polymeric layer) including the thermoplastic polymer and the fiber (e.g., metallic fiber), that can be later sandwiched between two metallic layers.

Yet another aspect of the invention contemplates a precursor polymeric feedstock material containing the polymer and the fibers. Such a polymeric feedstock material may be formed (e.g., molded or extruded) into the polymeric layer (e.g., into a sheet) either as a single material or by diluting with one or more additional materials (e.g., one or more additional polymers). As such, the precursor polymeric feedstock material may include some or all of the components in the polymeric layer of the composite material. Preferably, the precursor polymeric feedstock material includes substantially all of the fiber for the polymeric layer.

In use, the composites may be deformed (e.g., formed, such as by stamping), attached to another structure (e.g., to steel or to another composite material), or both. A preferred approach is to employ a step of welding the composite of the invention to the other structure. The formed panel may be joined to other parts, when necessary, by techniques other than welding, such as by using adhesives, a brazing process, or the like. In both cases, the composite material (e.g., the laminate or sandwich sheet) is formable by low-cost stamping methods and yet is surprisingly free of the limitations that have been faced previously in the art. The unique features of the composite material render it an extremely attractive candidate for applications which traditionally utilize a regular monolithic metal sheet, such as in the body panels currently employed in the transportation (e.g., automotive) industry.

One unique feature of the invention is that it includes specific selection of the polymer (e.g., thermoplastic polymer) and the metal fibers, and incorporation of metal fibers and optional particles, as well as other optional fillers, into the polymeric matrix to produce a novel formable composite material (e.g. sandwich or laminate structure) for low-cost stamping operation. Another novelty is that the stampable sandwiches can be joined by conventional welding techniques such as resistance welding (e.g., spot welding, seam welding, flash welding, projection welding, or upset welding), energy beam welding (e.g., laser beam, electron beam, or laser hybrid welding), gas welding (e.g., oxyfuel welding, using a gas such as oxyacetylene), arc welding (e.g., gas metal arc welding, metal inert gas welding, or shielded metal arc welding). Preferred joining techniques include high speed welding techniques such as resistance spot welding and laser welding.

Various features of formable/stampable materials, test methods, test criteria, descriptions of defects, welding processes and characteristics, and descriptions of forming processes are described in the following publications, all expressly incorporated herein by reference:

M. Weiss, M. E. Dingle, B. F. Rolfe, and P. D. Hodgson, "The Influence of Temperature on the Forming Behavior of Metal/Polymer Laminates in Sheet Metal Forming", Journal of Engineering Materials and Technology, October 2007, Volume 129, Issue 4, pp. 530-537.

D. Mohr and G. Straza, "Development of Formable All-Metal Sandwich Sheets for Automotive Applications", Advanced Engineering Materials, Volume 7 No. 4, 2005, pp. 243-246.

J. K. Kim and T. X. Yu, "Forming And Failure Behaviour Of Coated, Laminated And Sandwiched Sheet Metals: A Review", Journal of Materials Processing Technology, Volume 63, No 1-3, 1997, pp. 33-42.

K. J. Kim, D. Kim, S. H. Choi, K. Chung, K. S. Shin, F. Barlat, K. H. Oh, J. R. Youn, "Formability of AA5182/polypropylene/AA5182 Sandwich Sheet, Journal of Materials Processing Technology, Volume 139, Number 1, 20 August 2003, pp. 1-7.

Trevor William Clyne and Athina Markaki U.S. Pat. No. 6,764,772 (filed Oct 31, 2001, issued Jul. 20, 2004).

Frank Gissinger and Thierry Gheysens, U.S. Pat. No. 5,347,099, Filed Mar 4, 1993, Issued Sep 13, 1994, "Method And Device For The Electric Welding Of Sheets Of Multilayer Structure".

Straza George C P, International Patent Application Publication (PCT): WO2007062061, "Formed Metal Core Sandwich Structure And Method And System For Making Same", Publication date: May 31, 2007.

Haward R. N., Strain Hardening of Thermoplastics, Macromolecules 1993, 26, 5860-5869. International Patent Application Publication WO 2010/021899 (published on Feb. 25, 2010 by Mizrahi).

U.S. patent application Nos. 61/290,384 (filed on Dec. 28, 2009 by Mizrahi), 61/089,704 (filed on Aug. 18, 2008 by Mizrahi), 61/181,511 (filed on May 27, 2009 by Mizrahi), 12/540,771 (filed on Aug. 13, 2009 by Mizrahi), 61/290,384 (filed on Dec. 28, 2009 by Mizrahi), and 12/978,974 (filed on Dec. 27, 2010 by Mizrahi).

Materials

By way of example, the use of a fibrous filler (and in one particular aspect, a ribbon fiber filler) in the polymeric layer is believed to facilitate composite manufacturing and surprisingly low levels may be employed to achieve the beneficial results herein. Surprisingly, the selection and combination of materials taught herein affords the ability to employ less metal per unit volume than conventional metal structures of like form (e.g., sheet metal) while still exhibiting comparable properties and characteristics. The problem that the skilled artisan might envision in such a combination of materials unexpectedly are avoided. In this regard, some of the behavioral characteristics of the materials that might be predicted are surprisingly avoided, are employed advantageously in the resulting composite, or both. The resulting laminates thus render themselves as attractive candidates to be a drop-in substitute for existing materials, for example, they can be employed instead of sheet steel, at substantial weight savings as compared with steel, without the need for significant investment in resources to re-tool or significantly alter processing conditions.

Polymeric Layer

The polymeric layer generally may include or even consist essentially of a filled polymer, (e.g., a thermoplastic polymer filled with a mass of reinforcing fibers, such as a mass of metallic fibers, and more particularly a mass including steel ribbon fiber components).

The filled polymeric material for use in the polymeric layer preferably is one that generally would be characterized as being relatively rigid, relatively strong, have a relatively high elongation at break, have high strain hardening properties, is light weight, or any combination thereof, such as described in International Patent Application Publication WO 2010/021899 (published on Feb. 25, 2010 by Mizrahi), incorporated herein by reference in its entirety (see for example paragraphs 015-022, 029-051, and 085-091).

Preferably, at least some of the polymer in the filled polymeric material is a thermoplastic, but it may be or include a thermoset polymer, particularly a thermoset polymer that is processable as a thermoplastic, but cured. Preferably, at least 50% (more preferably at least 60%, 70%, 80%, 90% or even 95%, if not 100%) by weight of the polymer used in the filled polymeric material is a thermoplastic polymer.

The filled polymeric material may have electrical conductivity properties (e.g., the filled polymeric material may be an electrical conductor) such that a conductive path is provided through the filled polymer and the composite material may be welded to another structure such as a sheet metal. The electrical conductivity properties of the polymeric core material may be achieved by employing metallic fibers and optionally metallic or carbon black particles that are dispersed in the polymer in a quantity to have at least a percolation concentration, such as described in International Patent Application Publication WO 2010/021899 (published on Feb. 25, 2010 by Mizrahi), see for example paragraphs 064-081 incorporated herein by reference. The filled polymeric material and the composite materials of the present teachings may be weldable using art-disclosed welding processes (e.g., weld schedules) or with other welding processes (e.g., weld schedules) as described in International Patent Application Publication WO 2010/021899 (published on Feb. 25, 2010 by Mizrahi) (see for example paragraphs 15, 20-22, 29-30, 37-39, 47, 109, and 112-117, incorporated herein by reference) and U.S. patent application Ser. No. 12/978,974 (filed on Dec. 27, 2010 by Mizrahi)(see for example paragraphs 019-31, and 034-042, and 055-137, incorporated herein, by reference). For example, the materials may allow for more economical weld schedules that are faster, require less energy, or both.

The filled polymeric material (e.g., the polymer of the filled polymeric material) may additionally include one or more additives known to the polymer compounding art, such as described in International Patent Application Publication WO 2010/021899 (published on Feb. 25, 2010 by Mizrahi). For example, the filled polymeric material may include halogenated flame retardant compounds disclosed in U.S. Pat. Nos. 3,784,509 (Dotson et. al., Jan. 8, 1974, see for example the substituted imides described in column 1, line 59 through column 4, line 64), 3,868,388 (Dotson et al. Feb. 25, 1975, see for example the halogenated bisimides described in column 1, line 23 through column 3, line 39); 3,903,109 (Dotson et al. Sep 2, 1975, see for example the substituted imides described in column 1, line 46 through column 4, line 50); 3,915,930 (Dotson et al. Oct. 28, 1975, see for example halogenated bisimides described in column 1, line 27 through column 3, line 40); and 3,953,397 (Dotson et al. Apr. 27, 1976, see for example the reaction products of a brominated imide and a benzoyl chloride described in column 1, line 4 through column 2, line 28), each of which is incorporated by reference in its entirety. The polymer, the filled polymeric material or both may include one or more additives for improving the adhesion between the polymer and a surface of the metallic layer. The polymer, the filled polymeric material or both, may include one or more additives to improve the drawing (e.g., stamping) of the composite material. The polymer, the filled polymeric material or both may include one or more additives for controlling (e.g., increasing or decreasing) the shrinkage of the filled polymeric material when the filled polymeric material is cooled from a melt state to a solid state. The polymer may be substantially free of, or entirely free of additives that reduce the adhesion between the polymer and a metallic layer (e.g., a steel layer).

The filled polymeric material may be free of a plasticizer or other relatively low molecular weight materials which may become volatilized (e.g., during a resistance welding process). If employed, the concentration of plasticizer or other relatively low molecular weight materials preferably is less than about 3 wt. %, more preferably less than about 0.5 wt. %, and most preferably less than about 0.1 wt. % based on the total weight of the filled polymeric material (e.g., such that the filled polymeric material does not delaminate from a metallic layer).

It is also possible the teachings herein contemplate a step of selecting materials, processing conditions, or both, so that during processing, delamination of the filled polymeric material from the metallic layer is substantially, or entirely avoided (e.g., delamination caused by vapor pressure buildup at an interface between the filled polymeric material and the metallic layer sufficient for causing delamination).

Polymers

With more attention now to particular examples of polymers for use herein, the polymers used for the filled polymeric material preferably include thermoplastic polymers that either have a peak melting temperature (as measured according to ASTM D3418-08) or a glass transition temperature (as measured according to ASTM D3418-08) greater than about 50° C. (preferably greater than about 80° C., even more preferably greater than about 100° C., even more preferably greater than about 120° C., more preferably greater than about 160° C., even more preferably greater than 180° C., and most preferably greater than about 205° C.). The thermoplastic polymer may have a peak melting temperature, a glass transition temperature, or both that is less than about 300° C., less than about 250° C., less than about 150° C., or even less than about 100° C. They may be at least partially crystalline at room temperature or substantially entirely glassy at room temperature. Suitable polymers (e.g., suitable thermoplastic polymers) may be characterized by one or any combination of the following tensile properties (measured according to ASTM D638-08 at a nominal strain rate of 0.1 s$^{-1}$): a tensile modulus (e.g., Young's Modulus) greater than about 30 MPa, (e.g., greater than about 750 MPa, or greater than about 950 MPa); an engineering tensile strength (i.e., $\sigma_e$), a true tensile strength (i.e., $\sigma_t$, where $\sigma=(1+\epsilon_e)\sigma_e$ where $\epsilon_e$ is the engineering strain), or both, greater than about 8 MPa (e.g., greater than about 25 MPa, greater than about 60 MPa, or even greater than about 80 MPa); or a plastic extension at break or elongation at failure of at least about 20% (e.g., at least about 50%, at least about 90%, or even at least about 300%). Unless otherwise specified, the term tensile strength refers to engineering tensile strength.

The polymer may preferably have strain hardening properties (e.g., a relatively high strain hardening modulus, a relatively low extrapolated yield stress, or both), such as described in International Patent Application Publication WO 2010/021899 (published on Feb. 25, 2010 by Mizrahi), see for example paragraphs 052-063, incorporated herein by reference. As such, the strain hardening properties may be measured using the method of Haward R. N., Strain Hardening of Thermoplastics, Macromolecules 1993, 26, 5860-5869, incorporated herein by reference in its entirety.

Examples of thermoplastic polymers which may be used for the polymeric layer include polyolefins (e.g. polyethylene, polypropylene or both), acetal copolymers, polyamides, polyamide copolymers, polyimides, polyesters (e.g., polyethylene terephthalates and polybutylene terephthalate), polycarbonates, thermoplastic polyurethanes, thermoplastic polyether-ester copolymers (such as a thermoplastic elastomer ether-ester material described in ASTM D 6835-08, incorporated herein by reference), acrylonitrile butadiene styrene copolymers, polystyrenes, copolymers including at least 60 wt. % of an α-olefin and at least one additional monomer (such as an ethylene copolymers including at least 80 wt. % ethylene), copolymers including any of these polymers, ionomers including any of these polymers, blends of any of these polymers, or any combination thereof.

The thermoplastic polymer may include a polyolefin, such as a polyolefin described in paragraph 065 of U.S. Provisional Patent Application 61/371,360 filed on Aug. 6, 2010, incorporated herein by reference. The polyolefin may be a homopolymer or a copolymer. The polyolefin may include, consisting essentially of, or consisting entirely of one or more α-olefins, such as one or more α-olefins having from about 2 to about 10 carbon atoms.

Preferable polyolefins include polypropylene homopolymers (e.g., isotactic polypropylene homopolymer), polypropylene copolymers (e.g., random polypropylene copolymers, impact polypropylene copolymer, or other polypropylene copolymer containing isotactic polypropylene), polyethylene homopolymer (e.g., high density polyethylene, or other polyethylene having a density greater than about 0.94 g/c$m^3$), polyethylene copolymers (e.g., preferably including at least about 60% ethylene, more preferably at least 80 wt. % ethylene), low density polyethylene, a blend of any of these polymers, or any combination thereof. Polypropylene homopolymers and polypropylene copolymers may be substantially free of atactic polypropylene. If present, the concentration of atactic polypropylene in the polypropylene preferably is less than about 10 wt. %. Without limitation, copolymers that may be employed include copolymers (e.g., polypropylene copolymers or polyethylene copolymers) that that consist essentially of (e.g., at least 98% by weight), or consist entirely of one or more α-olefins. More preferred polyolefins include high density polyethylene (e.g., having a density greater than about 0.945 g/cm$^3$, such as from about 0.945 to about 0.990 g/cm$^3$ or from about 0.945 to about 0.960 g/cm$^3$), low density polyethylene (e.g., a polyethylene having a sufficient concentration of long chain branches, typically greater than about 15 carbon atoms long, so that its density is about 0.945 g/cm$^3$ or less), linear low density polyethylene (e.g., a copolymer having a density of about 0.915 to about 0.930 g/cm$^3$), medium density polyethylene (e.g., a copolymer having a density of about 0.930 to about 0.945 g/cm$^3$), very low density polyethylene (e.g., having a density of about 0.900 to about 0.915 g/cm$^3$), polyethylene plastomers (e.g., a copolymer having a density of about 0.860 to about 0.900 g/cm$^3$), isotactic polypropylene homopolymer, isotactic polypropylene copolymers (e.g., having a crystallinity of about 5 wt. % or more), impact polypropylene, polypropylene block copolymers including one or more blocks of isotactic polypropylene, mixtures thereof, or any combination thereof. Even more preferred polyolefins include low density polyethylene, linear low density polyethylene, very low density polyethylene, or any combination thereof. Other polyolefins that may be used include copolymers of at least one olefin and one or more monomers that is not an olefin. For example, other polyolefins that may be employed include copolymers that include, consist essentially of, or consist entirely of i) one or more α-olefins (e.g., at least 60 wt. % of an α-olefin) and ii) one or more polar comonomers, such as a polar comonomer selected from the group consisting acrylates, (e.g., methyl acrylate, butyl acrylate, or both), vinyl acetate, acrylic acids (e.g., acrylic acid, methacrylic acid, or both), methyl methacrylate, or any combination thereof. The concentration of the comonomer may be less than about 40 wt. %, preferably less than about 25 wt. %, more preferably less than about 20 wt. %, and most preferably less than about 15 wt. % based on the total weight of the copolymer. Exemplary polyethylene copolymers that may be used include ethylene-co-vinyl acetate (i.e., "EVA", for example containing less than about 20 wt. % vinyl acetate), ethylene-co-methyl acrylate (i.e., EMA), ethylene co-methacrylic acid, or any combination thereof. Exemplary α-olefins that may be used in the copolymer include ethylene, propylene, butene, hexene, octene, or any combination thereof.

Polyamides useful in the present teachings may include polymers having one or more repeating units that includes an amide groups along the backbone of the polymer chain. For example, polyamides may be a reaction products of a diamine and a diacid. Other examples of polyamides include monadic polyamides. Generally, monadic polyamides are formed by a ring opening reaction. Exemplary polyamides which are formed from a diamine and a diacid may include polyamides (e.g., nylons) containing reaction products of either adipic acid or terephthalic acid with a diamine. Exemplary monadic polyamides include nylon 6, and poly(p-benzamide). The nylon may be a homopolymer, a copolymer, or a mixture thereof. Preferred polyamide homopolymers which may be used in the present invention include nylon 3, nylon 4, nylon 5, nylon 6, nylon 6T, nylon 66, nylon 610, nylon 612, nylon 69, nylon 7, nylon 77, nylon 8, nylon 9, nylon 10, nylon 11, nylon 12, and nylon 91. Copolymers containing any of the above mentioned polyamides may also be used. Polyamide copolymers may be random copolymers, block copolymers, a combination thereof. Examples of polyamide copolymers include polymers having a plurality of different amides (i.e., a polyamide-polyamide copolymers), polyesteramide copolymers, polyetheresteramide copolymers, polycarbonate-ester amides, or any combination thereof.

A polyamide-polyamide copolymer may include two or more of the polyamides described herein for a polyamide homopolymer. Preferred polyamide-polyamide copolymers include, polyamide 6 and polyamide 66, polyamide 610, or any combination thereof. For example, a polyamide-polyamide copolymer may consist essentially of two or more polyamides selected from the group consisting of polyamide 6, polyamide 66, polyamide 69, polyamide 610, polyamide 612, and polyamide 12. More preferably the polyamide-polyamide copolymer consists essentially of two or more polyamides selected from the group consisting of polyamide 6, polyamide 66, polyamide 69, and polyamide 610. Examples of such copolymers include polyamide 6/66, polyamide 6/69, and polyamide 6/66/610. A particularly preferred polyamide-polyamide copolymer is a polyamide 6/66 copolymer. The concentration of polyamide 66 in the polyamide 6/66 copolymer may be about 90 weight percent or less, preferably about 70 weight percent or less, more preferably about 60 weight percent or less, and most preferably about 50 weight percent or less, based on the total weight of the copolymer. The concentration of polyamide 6 in the polyamide 6/66 copolymer may be about 10 weight percent or more, preferably about 30 weight percent or more, more preferably about 40 weight percent or more, and most preferably about 50 weight percent or more, based on the total weight of the copolymer. Another particularly preferred polyamide-polyamide copolymer is a random or block copolymer of a polyamide 6 and polyamide 69. Polyamide copolymers (i.e., a copolymer including one or more amide monomers) may include a polyether, such as an aliphatic ether or an aromatic ether.

Polyethers which may be used in a polyamide copolymer may be formed by the polymerization of a diol, such as a glycol (e.g., with one or more additional monomers). Exemplary glycols which may be used include propylene glycol, ethylene glycol, tetramethylene glycol, butylene glycol, or any combination thereof. Any of the above copolymers may be a block copolymer including a relatively soft block and a relatively hard block. The ratio of the elastic modulus of the relatively hard block to the relatively hard block may be greater than about 1.1, preferably greater than about 2, and more preferably greater than about 10. The relatively hard block may include or consist essentially of one or more aromatic amides, one or more semi-aromatic amides, or one or more aliphatic amides. The relatively soft block may include a polyester, such as a polyester described above (e.g., an aliphatic polyester), a polycarbonate (e.g., an aliphatic polycarbonate), a polyether (e.g., an aliphatic polyether), or any combination thereof. Amide copolymers may include a first monomer (e.g., a first amide monomer) and a second monomer, each both independently having a concentration greater than about 5 wt. %, preferably greater than about 20 wt. %, more preferably greater than about 30 wt. % and most preferably greater than about 40 wt. %, based on the total weight of the copolymer. The concentration of the first monomer, the second monomer, or both independently may be less than about 95 wt. %, preferably less than about 80 wt. %, more preferably less than about 70 wt. %, and most preferably less than about 60 wt. % based on the total weight of the copolymer. The combined concentration of the first monomer and the second monomer may be greater than about 50 wt. %, preferably greater than about 75 wt. %, more preferably greater than 90 wt. %, and most preferably greater than about 95 wt. % based on the total weight of the copolymer.

The polyamide copolymer may be characterized as a thermoplastic elastomer, having a relatively low melting temperature, a relatively low elastic modulus, or both. For example, the copolymer may have a relatively low melting temperature compared to the highest melting temperature of any of the homopolymer consisting essentially of one of the monomers of the copolymer. For example, the copolymer may have a relatively low elastic modulus compared to the highest elastic modulus of any of homopolymer consisting essentially of one of the monomers of the copolymer. Preferred polyamide copolymers may be characterized by a melting point less than about 220° C. (preferably less than about 190° C., more preferably less than about 170° C., and most preferably less than about 150° C.) as measured according to ASTM D3418-08; a melting point greater than about 60° C. (preferably greater than about 80° C., more preferably greater than about 100° C., and most preferably less than about 110° C.) as measured according to ASTM D3418-08; an elastic modulus less than about 2.5 GPa (preferably less than about 1.2 GPa, more preferably less than about 800 MPa, and most preferably less than about 500 MPa), as measured according to ASTM D638-08; an elastic modulus greater than about 50 MPa (preferably greater than about 100 MPa, and more preferably greater than about 200 MPa), as measured according to ASTM D638-08; a strain at break greater than about 50% (preferably greater than about 90%, more preferably greater than about 300%), as measured according to ASTM D638-08; or any combination thereof.

Preferred ionomers mixtures of an ionic compound and a copolymer including a polar monomer and a nonpolar monomer. Non-polar monomers that may be used in the copolymer of an ionomer include α-olefins, such as α-olefins having from 2 to about 20 carbon atoms (e.g., from about 2 to about 8 carbon atoms). Exemplary nonpolar monomers that may be employed include ethylene, propylene, 1-butene, 1-hexene, and 1-octene, or any combination thereof. Suitable polar monomers include monomers which upon polymerization have an ionic group. Without limitation, examples of polar monomers that may be employed in the copolymer of the ionomer include acids, such as acids having from about 2 to about 20 carbon atoms (e.g., methacrylic acid, ethacrylic acid. The concentration of the polar monomer in the copolymer of the ionomer may be less than about 40 wt. %, preferably less than about 25 wt. %, and more preferably less than about 20 wt. %, based on the total weight of the ionomer. The concentration of the polar monomer in the Suitable ionic compounds for the ionomer include compounds containing one or more alkali earth metals, one or more alkaline earth metals, or both. Without limitation, the ionic compound may include sodium, potassium, lithium, calcium, magnesium, or any combination thereof. Particularly preferred ionic compounds include sodium hydroxide, potassium hydroxide, calcium hydroxide and magnesium hydroxide. By way of example, commercially available ionomers include SURLYN® poly(ethylene-co-methacrylic acid) ionomer and NAFION® perfluorosulfonate ionomers.

Preferred polyurethanes include thermoplastics formed from polymerizing one or more diisocyanates and one or more diols. More preferred polyurethanes include thermoplastic formed from polymerizing one or more diisocyanates and two or more diols. The polyurethane may be a thermoplastic polyurethane elastomer, such as one including a first polymer block containing a first diol and a second polymer block than includes a second diol, where the first block is a relatively hard block (e.g., having a relatively high modulus) and the second block is a relatively soft block (e.g., having a modulus lower than the relatively hard block). The concentrations of the relatively hard block and the relatively soft block may each independently be greater than about 5 wt. %. preferably greater than about 10 wt. %, and more preferably greater than about 20 wt. % based on the total weight of the copolymer. The concentrations of the relatively hard block and the relatively soft block may each independently be less than about 95 wt. %, preferably less than about 90 wt. %, and more preferably less than about 20 wt. % based on the total weight of the copolymer. The total concentration of the relatively hard block and the relatively soft block may be greater than about 60 wt. %, preferably greater than about 80 wt. %, more preferably greater than about 95 wt. %, and most preferably greater than about 98 wt. % based on the total weight of the polymer. Commercially available thermoplastic polyurethanes (TPU) that may be employed include ESTANE® brand TPU available from Lubrizol Corporation, ELASTO- LAN® brand TPU available form BASF and DESMOPAN® brand TPU available from Bayer.

The thermoplastic polymer may be selected so that it includes relatively long chains, such that they may have a number. average molecular weight greater than about 20,000, preferably greater than about 60,000, and most preferably greater than about 140,000. They may be unplasticized, plasticized, elastomer modified, or free of elastomer. Semi-crystalline polymers may have a degree of crystallinity greater than about 10 wt %, more preferably greater than about 20 wt %, more preferably greater than about 35 wt %, more preferably greater than about 45 wt %, and most preferably greater than about 55 wt %. Semi-crystalline polymers may have a degree of crystallinity less than about 90 wt %, preferably less than about 85 wt %, more preferably less than about 80 wt %, and most preferably less than about 68 wt %. Crystallinity of the thermoplastic polymer may be measured using differential scanning calorimetry by measuring the heat of fusion and comparing it to art known heat of fusion for the specific polymer.

The polymer preferably may be selected so that it has a melt index sufficiently high so that the polymer can be processed using extrusion equipment. Preferred polymers have a melt flow rate of about 0.05 g/10 min or more, about 01 g/10 min or more, or about 0.3 g/10 min or more as measured according to ASTM D1238 at 190° C./2.16 kg. The polymer preferably has a melt index sufficiently low so that the polymer has good mechanical properties. Preferred polymers have a melt flow rate of about 150 g/10 min or less, about 80 g/10 min or less, about 50 g/10 min or less, about 20 g/10 min or less, or about 4 g/10 min or less as measured according to ASTM D1238 at 190° C./2.16 kg.

The polymer preferably may be selected so that it has a sufficiently high dart drop impact (in units of g, measured according to ASTM 1790A on a 2 mil thick film) so that the polymer resists cracking during a high speed stamping operation. Preferred polymers have a dart drop impact of about 10 g or more, about 40 g or more, about 100 g or more, about 150 g or more, about 200 g or more, or about 250 g or more, as measured according to ASTM D1790A (2 mil).

The polymer of the filled polymeric material may also contain up to about 10 wt % of a grafted polymer (e.g., a grafted polyolefin such as isotactic polypropylene homopolymer or copolymer) which is grafted with a polar molecule, such as maleic anhydride.

The thermoplastic polymer may include a substantially amorphous polymer (e.g., a polymer having a crystallinity less than about 10 wt. %, preferably less than about 5 wt. %, and most preferably less than about 1 wt. %, as measured by differential scanning calorimetry at a rate of about 10° C./min). For example, the thermoplastic polymer may include a substantially amorphous polymer having a glass transition temperature greater than 50° C., preferably greater than 120° C., more preferably greater than about 160° C., even more preferably greater than about 180° C., and most preferably greater than about 205° C., as measured by dynamic mechanical analysis at a rate of about 1 Hz. Exemplary amorphous polymers include polystyrene containing polymers, polycarbonate containing polymers, acrylonitrile containing polymers, and combinations thereof.

Without limitation, examples of styrene containing copolymers that may be employed in the filled polymeric material are described in International Patent Application Publication WO 2010/021899 (published on Feb. 25, 2010 by Mizrahi).

In lieu of or in addition to any thermoplastic polymer, the polymeric layer may employ an elastomer having one or both of the following properties: a relatively low tensile modulus at 100% elongation (e.g., less than about 3 MPa, preferably less than about 2 MPa), a relatively high tensile elongation at break (e.g., greater than about 110%, preferably greater than about 150%) both measured according to ASTM D638-08 at a nominal strain rate of about $0.1\ s^{-1}$. Examples of elastomers that may be employed, are described in International Patent Application Publication WO 2010/021899 (published on Feb. 25, 2010 by Mizrahi).

Though it is possible that some amounts of epoxy may be used, the polymer of the filled polymeric material preferably is substantially free or entirely free of epoxy, or other brittle polymers (e.g., polymers having an elongation at failure of less than about 20% as measured according to ASTM D638-08 at a nominal strain rate of about $0.1\ s^{-1}$), or both. If present, the concentration of epoxy, other brittle polymers, or both is preferably less than about 20%, more preferably less than about 10%, more preferably less than about 5%, and most preferably less than about 2% by volume, based on the total volume of the filled polymeric material.

In one particularly preferred aspect of the teachings, the filled polymeric material may include one or more polyamide copolymers, one or more thermoplastic polyurethanes, one or more thermoplastic polyether-ester copolymers, one or more polyolefins, one or more ionomers, or any combination thereof. The polyamide copolymer may be any of the polyamide copolymers described above herein. Preferred polyamide copolymers include polyamide-polyamide copolymers, polyesteramide copolymers, polyetheresteramides, polycarbonate-esteramide copolymers, or any combination thereof. Any of the thermoplastics may be a random copolymer or a block copolymer. Any of the thermoplastics may be a thermoplastic elastomer. By way of example, the filled polymeric material may include a polyester amide thermoplastic elastomer, a polyetheresteramide thermoplastic elastomer, a polycarbonate-esteramide thermoplastic elastomer, a polyether-ester thermoplastic elastomer, a amide block copolymer thermoplastic elastomer, or any combination thereof. The filled polymeric material may optionally include one or more polymers that is not a copolymer. For example filled polymeric material may include one or more polyamide homopolymer. Particularly preferred polyamide homopolymers include polyamide 6 and polyamide 6,6. If employed the concentration of the one or more polyamide homopolymers preferably is relatively low (e.g., compared with the concentration of the one or more copolymers. If present, the concentration of the one or more polyamide homopolymers preferably is about 50 weight percent or less, more preferably about 40 weight percent or less, even more preferably about 30 weight percent or less, and most preferably about 25 weight percent or less, based on the total weight of the polymer in the filled polymeric material.

Without limitation, examples of thermoplastic polymers that may be employed in the filled polymeric material include thermo polyamide copolymers that may be employed include polyamide copolymers (such as LUMID® available from LG Chemical Ltd., GRIVORY®, GRILAMID®, and GRILON® available from EMS-Grivory (e.g., GRILON® CA 6 E, GRILON® CF6 S, GRILON® CR 8, GRILON® CR 9, GRILLON® BM 13 SBG, or GRILLON BM 20 SBG), AMILAN® available from Toray Resin Company, DURETHAN® available from Lanxess Corporation, NYLENE® available from Custom Resins Group, ULTRAMID® available from BASF Corporation, and WELLAMID® available from Wellman Engineering Resins), polyether-amide copolymers (such as PEBAX® available from Arkema), nylon homopolymers (such as AEGIS® available from Honeywell, CHEMLON® available from Teknor Apex Company, NYMAX™ available from PolyOne Corporation, and NYPEL® available from BASF Corporation), thermoplastic polyurethanes (such as APILON® available from API SpA, DESMOPAN® available from Bayer Material Science AG, and ELASTOLLAN® available from BASF Polyurethanes GmbH). Without limitation, examples of polyolefins that may be employed in the filled polymeric material include ethylene copolymers (such as EXACT™ available from ExxonMobil Chemical, DOWLEX® available from Dow Chemical Company, and ENGAGE™ available from Dow Chemical Company), polypropylene and polypropylene copolymers (such as BORMED™ available from Borealis AG, FORMOLENE® available from Formosa Plastics Corporation, USA, VERSIFY™ available from Dow Chemical Company, and VISTAMAXX™ available from ExxonMobil Chemical). The thermoplastic polymer may include a molding grade, an extrusion grade, a film grade, a blow molding grade, a rotation molding grade, or any combination thereof. In one aspect of the invention, a film grade may provide surprisingly good adhesion with an adjoining sheet material.

In one aspect of the teachings herein, the polymer selected for the core material may be generally non-polar while still providing surprisingly good adhesion with an adjoining sheet material for forming the composite.

Nevertheless, the polymers selected for employment herein may be generally polar. Filled polymeric materials that include a generally polar polymer may have sufficient attraction between the polar polymer and the metallic fibers so that there is no need for a functionalized polymer to improve the adhesion between the thermoplastic and the metallic fibers. As such, the filled polymeric material may be substantially free of, or even entirely free of polymers having maleic anhydride, acrylic acid, an acrylate, an acetate, or any combination thereof. For example, the filled polymeric may include or may be substantially free, or entirely free of maleic grafted polymers. If employed, the concentration of polymers having maleic anhydride, acrylic acid, an acrylate, an acetate, or any combination in the filled polymeric material preferably about 20 weight percent or less, more preferably about 10 weight percent or less, even more preferably about 5 weight percent or less, even more preferably about 1 weight percent or less, and most preferably about 0.1 weight percent or less, based on the total weight of the polymer in the filled polymeric material. By way of example, generally polar polymers include acetal homopolymers or copolymers, polyamide homopolymers or copolymers, polyimide homopolymers or copolymers, polyester homopolymers or copolymers, polycarbonate homopolymers or copolymers, or any combination thereof. Filled polymeric materials that include a generally polar polymer may be substantially free of, or entirely free of polyolefin homopolymers and copolymers including about 50 weight percent of one or more olefins. If employed, the total concentration of any polyolefin homopolymers and any copolymers including about 50 weight percent of one or more olefins may be about 30 weight percent or less, preferably about 20 weight percent or less, more preferably about 10 weigh percent or less, even more preferably about 5 weight percent or less, and most preferably about 1 weight percent or less, based on the total weight of the polymers in, the filled polymeric material.

The filled polymeric material may include a single polymer or a mixture of two or more polymers as described in paragraph 0056 of U.S. Provisional Patent Application 61/371,360 filed on Aug. 6, 2010, incorporated herein by reference. For example, the filled polymeric material may include a mixture of a polyolefin and one or more second polymers, such as mixture of a polyolefin and a polar polymer, such as an ionomer. The material may include a sufficient amount of second polymer (e.g., the ionomer) so that the polymer adheres to the metal layers, to the metallic fiber, or both. The weight ratio of the second polymer to the polyolefin may be about 1:99 or more, about 3:97 or more, about 5:95 or more, about 10:90 or more, or about 20:80 or more. The weight ratio of the second polymer to the polyolefin may be about 99:1 or less, about 90:10 or less, about 70:30 or less, about 50:50 or less, or about 40:60 or less.

Fillers

The filled polymeric material (e.g., the filled thermoplastic polymeric layer) contains one or more fillers. The fillers may be a reinforcing filler, such as fibers, and more particularly metallic fibers. Metallic fillers (e.g., metallic fibers) that may be employed are described in International Patent Application Publication WO 2010/021899 (published on Feb. 25, 2010 by Mizrahi), see for example paragraphs 064-081, incorporated herein by reference and paragraphs 52-70, FIGS. 2A, 2B, 2C, 2D, 2E, 2F, 2G, 2H, 2I, 2J, 3, and 4 of U.S. patent application Ser. No. 12/978,974 (filed on Dec. 27, 2010 by Mizrahi), both incorporated herein by reference. For example, metallic fibers which may be used in the invention include fibers formed from metals such as steel (e.g., low carbon steel, stainless steel, and the like), aluminum, magnesium, titanium, copper, alloys containing at least 40 wt % copper, other alloys containing at least 40 wt % iron, other alloys containing at least 40 wt % aluminum, other alloys containing at least 40 wt % titanium, or any combination thereof. Preferred fibers include, consist essentially of, or consist entirely of steel. If employed, the steel of the fibers may be plain carbon steel (e.g., having a carbon concentration below about 0.2, 0.15 or even 0.08 weight %), though it may include one or more alloying elements (e.g., Ni, Cr, or other elements for defining a stainless steel). The fibers may carry a sacrificial anode material or element, such as described hereinafter. The fibers may combine a mixture of two or more types of fibers, such as a mixture of fibers of two or more different compositions (e.g., one of the fibers may be selected for a sacrificial anode), a mixture of two or more fibers of different cross-section profiles, of different sizes, or otherwise.

The filled polymeric material may contain other non-metallic conductive fibers, such as those described in International Patent Application Publication WO 2010/021899 (published on Feb. 25, 2010 by Mizrahi).

The filled polymeric material may include a metallic fiber or other filler that is capable of reducing or eliminating the corrosion of the metallic layers. In one approach, one or more of the metallic fibers or other fillers in the filled polymeric material may have a relatively high galvanic activity. For example, the metallic fibers or other fillers in the filled polymeric material may have a higher galvanic activity than the metal employed for the surface of one or preferably both of the metallic layers (of the composite material) in contact with or facing the filled polymeric material. As such, it may be desirable for the filled polymeric material to be substantially, or even entirely free of fillers having a low galvanic activity. By way of example, this approach to reducing the corrosion of a composite material may use a filled polymeric material that is substantially or entirely free of carbon black. The one or more fillers having a relatively high galvanic activity preferably have an anodic index that is greater than the metallic layer by about 0.05 V or more, more preferably by about 0.1 V or more, even more preferably by about 0.20 V or more, and most preferably by about 0.25 V or more. The one or more fillers having a relatively high galvanic activity may be any art known material having a higher galvanic activity than the metallic layer. By way of example, such fillers may includes one or more zinc containing materials, one or more magnesium containing materials, one or more aluminum containing materials, or any combination thereof. The one or more fillers may include a first filler and a second filler having a higher galvanic activity than the first filler, where the second filler is a sacrificial filler. If the filled polymeric materials includes a first filler and a sacrificial filler, the first filler preferably is a metallic fiber. The sacrificial filler may have a relatively high total surface area (i.e., of all of the sacrificial filler particles) compared to the surface are of the metallic layer, the total surface area of the first filler, or preferably both. For example, the ratio of the total surface are of the sacrificial filler to the surface area of the metallic layer may be about 1.5 or more, preferably about 3 or more, more preferably about 10 or more, and most preferably about 50 or more. If the filled polymeric materials includes a first filler and a sacrificial filler, the first filler may have a surface having a galvanic activity that is less than, equal to, or greater than the galvanic activity of the surface of the metallic layer. If the first filler has a surface having a galvanic activity greater than the galvanic activity of the surface of the metallic layer, the first filler may function as a sacrificial filler. As such, a second sacrificial filler may not be needed and the filled polymeric may be substantially or entirely free of a second sacrificial filler.

The metallic fibers preferably are selected so that the composite material has generally good weld characteristics. For example, the concentration of the metallic fibers, the size of the metallic fibers, the amount of contact between the metallic fibers, the shape of the metallic fibers, the amount of contact between a metallic fiber and the metal layers, or any combination thereof of may be selected so that the composite material has a generally good weld processing window, a generally high electrical conductivity, a generally high static contact resistance, or any combination thereof. A generally good weld processing window may be characterized for example by a high weld current range, a high weld time range, or both. The weld current range and the static contact resistance of the composite material may have features and may be measured according to the method described in paragraphs 111-117 of U.S. Provisional Patent Application No. 61/377,599 filed on Aug. 27, 2010 and paragraphs 013, 016, 023, 034-039, 076-080 and 121-126 and FIGS. 5-8 of U.S. patent application Ser. No. 12/978,974, filed on Dec. 27, 2010, both incorporated herein by reference.

The fibers or any other filler selected for use with the present teachings is such that, when used in combination with the polymeric component herein, and any associated material for defining the composite, will provide a weld current range for the composite material, Ic, when welded to a sheet of monolithic steel having the same thickness as the composite material that is preferably greater than the current range for two monolithic sheets of steel, Im, having the same thickness as the composite material. For example, the materials may be selected and employed such that the ratio of Ic to Im is preferably about 1.1 or more, more preferably about 1.2 or more, even more preferably about 1.3 or more, even more preferably about 1.4 or more, and most preferably about 1.5 or more. The current range of the composite material, Ic, may be about 1.5 kA or more, about 1.7 kA or more, about 1.9 kA or more, about 2.1 kA, about 2.3 kA or more, or about 2.5 kA or more. The static contact resistance of the composite material may be about 0.0020 Ω or less, about 0.0017 Ω or less, about 0.0015 Ω, about 0.0012 Ω or less, or about 0.0008 Ω or less. The materials may be selected and employed such the ratio of the static contact resistance of the composite material to the static contact resistance of steel (e.g., cold rolled steel, galvanized steel, galvannealed steel, or any combination thereof) may be about 1 or more, about 1.2 or more, about 1.5 or more, about 2 or more, about 3 or more, about 4 or more, about 5 or more or about 10 or more. It will be appreciated that if the static contact resistance is too high, the composite may have difficulty in passing a current and thus not be easily welded. As such, the materials may be selected and employed such that the ratio of the static contact resistance of the composite material to the static contact resistance of steel (e.g., cold rolled steel, galvanized steel, galvannealed steel, or any combination thereof) preferably is about 1000 or less, more preferably about 300 or less, even more preferably about 100 or less, even more preferably about 75 or less, and most preferably about 40 or less.

The metallic fibers preferably may have dimensions and distribution of dimensions as described in International Patent Application Publication WO 2010/021899 (published on Feb. 25, 2010 by Mizrahi). Without limitation, the metallic fibers may have a weight average length, $L_{avg}$, preferably about 200 μm or more, more preferably about 500 μm or more, even more preferably about 800 μm or more, even more preferably about 1 mm or more, even more preferably greater than about 2 mm, and most preferably greater than about 4 mm. Suitable fibers may have an $L_{avg}$ of less than about 200 mm, preferably less than about 55 mm, more preferably less than about 30 mm, and most preferably less than about 25 mm. The weight average diameter of the fibers may be greater than about 0.1 μm, more preferably greater than about 1.0 μm, and most preferably greater than about 4 μm. The weight average diameter of the fiber may be less than about 300 μm, preferably less than about 50 μm, even more preferably less than about 40 μm, and most preferably less than about 30 μm.

The metallic fibers may have any shape. The metallic fibers may include a curvilinear portion. Generally linear metallic fibers may be used. More preferably the metallic fibers are not straight fibers. By way of example, metallic fibers that are not straight, may have one or more bends, may have a generally arcuate profile, may have a generally helical shape, or any combination thereof. Metallic fibers that are initially straight, preferably become fibers that are not straight (such as described above) when combined with the polymer.

The metallic fibers may have one or more features described in paragraphs 099-102, 157, and FIG. 5 of U.S. Provisional Patent Application 61/371,360 filed on Aug. 6, 2010, incorporated herein by reference. For example, the cross-section of the metallic fiber (i.e., in the direction transverse to the length of the fiber) may have one or more flat sides. As such, a portion of a metallic fiber in the composite may have a planar contact with a metallic layer, with another fiber, or both. The metallic fiber may have a cross-section that is generally a polygonal having four or more sides, such as a cross-section that is generally rectangular, generally a parallelogram, or generally a square. Such fibers thus may be configured generally as elongated flat ribbon strips. The ratio of the length (e.g., the average length) to the width (e.g. the weighted average width) of the ribbon strips may be about 2 or more, about 4 or more, about 8 or more, or about 15 or more. The ratio of the length (e.g., the average length) to the width (e.g. the weighted average width) of the ribbon strips may be about 5000 or less, about 1000 or less, about 400 or less, about 100 or less, or about 30 or less. The ratio of the width (e.g., the weighted average width) to the thickness (e.g., the weighted average thickness) of the fibers may be 1 or more, about 1.4 or more, about 2 or more, about 3 or more, about 5 or more, or about 7 or more. The ratio of the width to the thickness of the fibers may be about 300 or less, about 100 or less, about 50 or less, or about 15 or less. Such fibers may be prepared by one or more fiber forming steps, such as a step of cutting a metallic foil (e.g., having a thickness that is about the thickness of the fibers) into narrow ribbon strips (e.g., the spacing between cuts may define the width of the fibers).

The cross-section of the metallic fibers, perpendicular to the length of the fiber, may have any geometry. For example, the cross-section may be a polygon (such as a rectangle or square) or other shape having generally straight sides, or the cross-section may include at least one side that is generally arcuate (for example, the metallic fibers may have a cross-section that is entirely arcuate, such as a substantially circular, or substantially oval shaped cross-section). The cross-sectional area of the metallic fibers in the plane transverse to the longitudinal axis preferably is about $1 \times 10^{-6}$ mm$^2$ or more, more preferably about $1 \times 10^{-5}$ mm$^2$ or more, even more preferably about $8 \times 10^{-5}$ mm$^2$ or more, even more preferably about $1 \times 10^{-4}$ mm$^2$ or more, and most preferably about $4 \times 10^{-4}$ mm$^2$ or more. The cross-sectional area of the metallic fibers in the plane transverse to the longitudinal axis preferably is about $2.5 \times 10^{-2}$ mm$^2$ or less, more preferably about $1 \times 10^{-2}$ mm$^2$ or less, even more preferably about $2.5 \times 10^{-3}$ mm$^2$ or less, and most preferably about $1 \times 10^{t3}$ mm$^2$ or less. For example, it is surprising that composite materials employing steel fibers having a cross-sectional area in the plane transverse to the longitudinal axis that are greater than about $8 \times 10^{-5}$ mm$^2$ have improved weld process window relative to materials having fibers with lower cross-sectional area. Such composite materials including the fibers having a cross-sectional area greater than about $8 \times 10^{-5}$ mm$^2$ maintain the high drawability and formability observed found for the composite materials with thinner fibers.

The metallic fibers may have a substantially constant thickness across the length of the fiber, across the width of the fiber, or both. A flat surface of the fiber may be smooth (i.e., generally free of texture), or may have a texture. For example a ribbon-like fiber may have both major surfaces that are smooth, both major surfaces that are textured, or one major surface that is textured and one major surface that is smooth.

A particularly preferred metallic fiber that may be used, optionally with one or more other fibers, is a steel fiber (e.g., a carbon steel fiber) having a generally rectangular cross-section (e.g., for defining a profile for the generally flat ribbon strips) in the direction transverse to the length. The metallic fiber may have a weighted average thickness of about 10 to about 70 μm, a weighted average width of about 40 to about 200 μm, a weighted average length of about 0.8 to about 5 mm, or any combination thereof.

When used in the polymeric layer between two metallic layers, the metallic fibers preferably are present as a mass of fibers. The mass of metallic fibers preferably includes a large number of fibers (e.g., 20 or more, 100 or more, 1000 or more, or 10000 or more). The mass of metallic fibers may be interconnected. The mass of metallic fibers may be entangled. The mass of fibers may form mechanical interlocks (i.e., two or more fibers may be mechanically interlocked). The mass of metallic fibers preferably spans with thickness of polymeric layer so that the mass of fibers (e.g., the network of metallic fibers) electrically connects the two metallic layers. Although a single metallic fiber may span the thickness of the polymeric layer, preferably none of the metallic fibers span the thickness of the polymeric layer. If metallic fibers span the thickness of the polymeric layer, the fraction of the fibers that span the thickness preferably is about 0.4 or less, more preferably about 0.20 or less, even more preferably about 0.10 or less, even more preferably about 0.04 or less, and most preferably about 0.01 or less. The fibers in the mass of fibers preferably are arranged in a non-ordered arrangement. For example, the maximum number of neighboring metallic fibers that are arranged in a generally aligned arrangement may be less than about 100, preferably less than about 50, more preferably less than about 20, even more preferably less than about 10, and most preferably less than about 5. More preferably the mass of fibers are arranged in a generally random arrangement. Individual metallic fibers that contact a surface of one of the metallic layers preferably are free of a planar contact (e.g., over the length of the fiber). As such, the composite material may be characterized as being essentially free, or even entirely free of planar contacts between a metallic fiber and a metallic layer. Fibers that contact a metallic surface, preferably have a line contact, a point contact, or a combination, thereof. Some of the metallic fibers may contact one of the metallic layers, however few, if any of the metallic fiber will contact a metallic layer over a large portion of the length of the metallic fiber. As such, a large fraction of the metallic fibers do not contact a metallic layer or at least have a significant portion that is not in contact with the metallic layer. The fraction of the metallic fibers that contact a metallic layer along at least half of the length of the fiber is preferably about 0.3 or less, more preferably about 0.2 or less, even more preferably about 0.1 or less, even more preferably about 0.04 or less, and most preferably about 0.01 or less.

The metallic fibers are preferably sufficiently thin and present in a sufficient concentration so that many fibers are arranged between the surfaces of the layer. For example, the average number of fibers that intersect a line parallel to the thickness direction of the polymeric layer and going through the polymeric layer preferably is about 3 or more, more preferably about 5 or more, more preferably about 10 or more, and most preferably about 20 or more. Without being bound by theory, it is believed that a large number of metallic fibers advantageously allows for more homogeneous deformation of the material, such as during a stamping process.

The concentration of the metallic fibers is preferably greater than about 1 volume %, more preferably greater than about 3 volume %, even more preferably greater than about 5 volume %, even more preferably greater than about 7 volume %, even more preferably greater than about 10 volume %, and most preferably greater than about 12 volume % based on the total volume of the filled polymeric material. The metallic fibers may be present in the filled polymeric material at a concentration less than about 60 volume %, preferably less than about 50 volume %, more preferably less than about 35 volume %, still more preferably less than about 33 volume %, and most preferably less than about 30 volume % (e.g., less than about 25 volume %, or even less than about 20, 10, or 5 volume %). For example the amount of fiber may be about 1%, 2%, 3%, 4%, 5%, 6%, 7%, 8%, 9%, or 10%, by volume based on the total volume of the filled polymeric material, or within a range bounded by those values (such as from about 1% to about 6%). It is possible that composites herein may employ a concentration of metallic fibers that surprisingly is substantially lower than the amount of a particle filler necessary to achieve similar welding characteristics. Moreover, it is also possible that the fibers and materials are selected so that better welding performance surprisingly may be realized at a relatively low concentration of metallic fibers as compared with an identical composite material having a higher concentration of metallic fibers. For example, it is surprisingly seen that using a filled polymeric material having about 10 volume % metallic fiber results in composite materials having superior welding characteristics compared with those made with filled polymeric materials having higher concentrations of metallic fiber.

The thermoplastic polymer material may be present in the filled polymeric material at a concentration greater than about 40 volume %, preferably greater than about 65 volume %, more preferably greater than about 67 volume %; still more preferably greater than about 70 volume %, and most preferably greater than about 75 volume % (e.g., at least about 80 volume %, at least about 90 volume %, or even at least about 95 volume %).

The volume ratio of the polymer (e.g., the thermoplastic polymer) to the fibers (e.g., the metallic fibers) is preferably greater than about 2.2:1, more preferably greater than about 2.5:1, and most preferably greater than about 3:1. The volume ratio of the polymer (e.g., the thermoplastic polymer) to the fibers (e.g., the metallic fibers) is preferably less than about 99:1, more preferably less than about 33:1, even more preferably less than about 19:1, and most preferably less than about 9:1, (e.g., less than about 7:1).

The material of any core in the sandwich composites herein may contain pores or voids, or may be substantially free of pores and voids. Preferably, the concentration of pores and voids in the filled polymeric material is less than about 25 volume %, more preferably less than about 10 volume %, still more preferably less than about 5 volume %, and most preferably less than about 2 volume % (e.g., less than about 1% by volume), based on the total volume of the filled polymeric material.

The fiber (e.g., the conductive fiber, such as the metallic fiber) preferably is present at a concentration greater than about 40 volume %, more preferably greater than about 70 volume %, and most preferably greater than about 80% (e.g., greater than about 90 volume %, or even greater than about 95 volume %) based on the total volume of the filler in the filled polymeric material.

The combined volume of the polymer (e.g., thermoplastic polymer) and the metallic fibers is preferably at least about 90% by volume, more preferably at least about 95% by volume and most preferably at least about 98% by volume based on the total volume of the filled polymeric material.

The metallic fibers provide one or any combination of electric conductivity for welding, a reinforcement for strengthening, or strain hardening the polymeric structure by utilizing fibers that as metals are capable of extending and imparting better strain hardening properties to the polymeric core. As such, the tensile elongation (at failure) of the metal fibers is preferably greater than about 5%, more preferably greater than about 30%, and most preferably greater than about 60% as measured according to ASTM A370-03a.

It is possible that the materials herein may employ in combination with fibers, a metallic particle. Metallic particles may be spherical, elongated, or of any shape other than a fiber shape. Metallic particles which may be employed include those described in International Patent Application Publication WO 2010/021899 (published on Feb. 25, 2010 by Mizrahi).

The fibers (e.g., the metallic fibers) or the combination of the fibers and the metallic particles preferably are dispersed (e.g., randomly dispersed) in the polymeric matrix at a volumetric concentration of less than about 30% (more preferably less than about 25%, and most preferably less than about 20%) by volume of the total polymeric layer). If metallic particles are employed, the ratio of the volume of the fibers (e.g., the metallic fibers) to the volume of the metallic particles in the filled polymeric material layer may be greater than about 1:30, preferably greater than about 1:1, and most preferably greater than about 2:1.

In one aspect of the invention, metallic particles, metallic fibers, or both may be obtained by a step of grinding offal and/or scrap such as described in International Patent Application Publication WO 2010/021899 (published on Feb. 25, 2010 by Mizrahi), see for example paragraph 124, incorporated herein by reference.

Metal Layers

As discussed, it is envisioned that composites herein may employ a sandwich structure by which a mass of a polymeric core is flanked on opposing sides by spaced apart layers. For example, a structure herein may include two sheets (e.g., metal sheets) that have a metal fiber reinforced polymeric core material disposed between the sheets and preferably in contact with the sheets. The metal layers (e.g., the first metallic layer and the second metal layer) of the sandwich construction may be made of a suitable material (e.g., metal) in the form of foils or sheets or other layers having equal or unequal thickness (e.g., average thickness) across the layer. Each metallic layer may have a generally constant thickness or may have a thickness that varies. The face metal on each side may be made of materials having the same or different properties and be made of the same or different metals. If the metal faces are made of metal sheets of unequal thickness, materials having different properties, or materials having different metal. The composite material may have a marking or other means of identifying and distinguishing the different metal faces. The layers may be the same or different in composition, size (e.g., thickness, width, volume, or otherwise), shape, or other features, relative to each other layer.

Examples of metal layers that may be employed are described in described in International Patent Application Publication WO 2010/021899 (published on Feb. 25, 2010 by Mizrahi), see for example paragraphs 082-091, incorporated herein by reference. Preferred metal layers include, or consist essentially of, or consist entirely of one or more steels.

Particularly preferred steel metal layers may be prepared using a process including one or more hot rolling steps, one or more cold rolling steps, one or more annealing steps, one or more cleaning steps, one or more tempering steps (e.g., a single roll, a double roll, or otherwise) or any combination thereof. Particularly preferred steel metal layers may have one or both surfaces that is bright (e.g., having a smooth finish or a lustrous smooth finish), stone (e.g., having a grindstone pattern), matte (e.g., having a satin finish or a blasted finish), or any combination thereof. The steel may be bare steel or otherwise coated, plated or treated, such as known in the art or described herein. Without limitation, a steel metal layer may include or consist essentially of, or consist entirely of tin milled black plate.

The metal layers may have one or more surfaces plated or coated (e.g., with a thin film), or having one or more other surface treatment (e.g., a treatment that cleans, etches, roughens, or chemically modifies a surface). A metal face may have one or more coatings, platings or surface treatments that improves the adhesion of a filled polymeric material to the metal layer. The metal layers may have one or more surfaces plated. coated or otherwise treated that provides corrosion resistance, improves adhesion to a paint or primer, improves stiffness, or any combination thereof. Exemplary coatings and platings may include one or any combination of galvanized, electrogalvanized, chrome plating, nickel plating, corrosion resistance treatment, e-coat, zinc coated, Granocoat, Bonazinc and the like. It will be appreciated that one or more coatings, platings, or surface treatments may be performed on the composite material, (e.g., after the composite material is prepared). As such, a surface of the metal layer facing the filled polymeric layer may be free of a coating, plating or surface treatment and an exposed surface of the metal layer may have a coating, plating or surface treatment. One or both metal faces may be free of a coating, plating or surface treatment (for example, the filled polymeric material may be treated or selected so that it provides good adhesion to the metal layer without the need for a coating, plating, or surface treatment).

One or both of the metal faces preferably may be relatively thick, such that the metal face does not wrinkle, tear, or form other defects when preparing and/or processing the composite material. Preferably, the thickness of one or both of the metal faces is at least about 0.05 mm, more preferably at least about 0.10 mm, even more preferably at least about 0.15 mm, and most preferably at least about 0.18 mm. The sheets may have a thickness less than about 3 mm, preferably less than about 1.5 mm, and more preferably less than about 1 mm, and most preferably less than about 0.5 mm. For example, the composite material may be used in an automotive panel requiring at least one class A or class B surface, preferably at least one class A surface (e.g., after a stamping step, a welding step, an electrocoating step, a painting step, or any combination thereof). Such a composite material may have a first surface which is a class A surface and a second surface which is not a class A surface. The class A surface may be the surface of a first metal face having a relatively high thickness and the surface that optionally is not a class A surface may be the surface of a second metal face having a relatively low thickness (e.g., at least about 20% or even at least about 40% less than the thickness of the first metal face). In general, the ratio of the thickness (e.g., average thickness) of the first metal layer to the thickness of the second metal layer may be from about 0.2 to about 5, preferably from about 0.5 to about 2.0, more preferably from about 0.75 to about 1.33 and most preferably from about 0.91 to about 1.1.

Surprisingly, the filled polymeric layer may provides sufficient stiffness with respect to the flexural modulus of the composite material so that down gauging is possible, for example by employing a high strength steel for one or more metallic layers of the light weight composite material, such as described in paragraphs 120 and 121 of U.S. Provisional Patent Application No. 61/377,599 filed on Aug. 27, 2010, incorporated herein by reference. The first metal layer, the second metal layer, or both may include a sufficient amount of high strength steel so that the flexural modulus of the composite material is at least about 200 GPa, as measured according to ASTM D790, wherein the concentration of the filled polymeric layer is at sufficiently high so that the density of the composite material is about 0.8 $d_m$ or less, where $d_m$ is the weighted average density of the first metal layer and the second metal layer. Surprisingly such composite materials may have one or both of the following characteristics a high yield strength of about 100 MPa or more, about 120 MPa or more, about 140 MPa or more, about 170 MPa or more, about 200 MPa or more, or about 240 MPa or more); or a high tensile strength of about 160 MPa or more, about 200 MPa or more, about 220 MPa or more, about 250 MPa or more, about 270 MPa or more, about 290 MPa or more, or about 310 MPa or more.

Composite Material

The composite material may be in the form of a multi-layered sheet, e.g., a sandwich structure including sheets of a material such as a metal that sandwich a core of the filled polymeric material. The sheets may have a total average thickness less than about 30 mm, preferably less than about 10 mm, more preferably less than about 4 mm and most preferably less than about 2 mm; and preferably greater than about 0.1 mm, more preferably greater than about 0.3 mm, and most preferably greater than about 0.7 mm). The composite material may have a generally uniform thickness or the composite material may have a thickness that varies (e.g., a random or periodic variation in one or more directions). For example, the variation in the thickness may be such that the standard deviation of the thickness is less than about 10% of the average thickness. The standard deviation of the thickness is preferably less than about 5% of the average thickness, more preferably less than about 2% of the average thickness, and most preferably less than about 1% of the average thickness.

The thickness of the filled polymeric layer may be greater than about 10%, 20% 30%, 40%, or more of the total thickness of the composite material. The volume of the filled polymeric layer may be greater than about 10%, 20%, 30%, 40%, or more of the total volume of the composite material. Preferably, greater than 50% of the volume of the composite material will be the filled polymeric material. The concentration of the filled polymeric material is more preferably greater than about 60 volume % and more preferably greater than about 70 volume % based on the total volume of the composite material. The concentration of the filled polymeric material is typically less than 92 volume % based on the total volume of the composite material; however, higher concentrations may be used, particularly in relatively thick composites (e.g., having a thickness greater than about 1.5 mm).

The total thickness of outer layers of a sandwich composite structure herein (e.g., metallic layers) may be less than about 70% of the total thickness of the composite material. The total thickness of metallic layers preferably is less than about 50%, more preferably less than about 40% and most preferably less than about 30% of the total thickness of the composite material. The total thickness of the outer layers (e.g., the metallic layers) may be greater than about 5%, preferably greater than about 10%, and more preferably greater than about 20% of the total thickness of thickness of the composite material.

The polymeric core layer preferably is in direct contact or indirect contact (such as via a primer and/or adhesive layer) with at least a portion of the surface of the adjoining layers (e.g., one or more metallic layer) facing the core layer. Preferably, the area of contact is at least about 30%, more preferably at least about 50%, most preferably at least about 70% of the total area of the surface of the adjoining layer facing the polymeric core layer. If a primer or adhesive layer is employed, the thickness preferably is sufficiently low so that it does not affect the electrical characteristics of the composite material. If employed, the ratio of the thickness of the primer and/or adhesive layer to the thickness of the polymeric core layer preferably is about 0.30 or less, more preferably about 0.20 or less, even more preferably about 0.10 or less, even more preferably about 0.05 or less, and most preferably about 0.02 or less. Two adjacent metallic layers preferably are substantially not in contact with each other. If a surface of a first metallic layer contacts a second metallic layer, the ratio of the area of contact to the area of the surface of the first metallic layer is preferably about 0.3 or less, more preferably about 0.1 or less, even more preferably about 0.05 or less, even more preferably about 0.02 or less, and most preferably about 0.01 or less.

The composite material may include a plurality of polymeric core layers. For example, the composite material may include one or more core layers which includes an adhesive such that it adheres to a metallic layer, a different core layer, or both.

The composite material may have a relatively high stiffness to density ratio, such as described in described in International Patent Application Publication WO 2010/021899 (published on Feb. 25, 2010 by Mizrahi), see for example paragraphs 042, 090, 118, and 143-143, incorporated herein by reference.

Surprisingly, the filled polymeric material, the core layer, or the composite materials, according to the teachings herein may have good sound insulation characteristics, high sound dampening, low sound transmission, reduce sound generation, reduce vibrations, or any combination thereof. For example, despite, having a sufficient concentration of metallic fibers so that the composite material may be welded using resistance welding, the composite material may provide low acoustical transmission characteristics. The composite material may have acoustical transmission properties such as described in International Patent Application Publication WO 2010/021899 (published on Feb. 25, 2010 by Mizrahi, paragraph 111, incorporated herein by reference. The composite material according to the teachings herein, may include a core layer that reduces acoustical transmission, reduces sound generation, reduces vibrations, or any combination thereof. The peak acoustical transmission (e.g., as measured according to SAE J1400), the peak vibration transmission, or both, through the composite material preferably may be less than the value for a monolithic material having the same dimensions, more preferably by at least 10%, even more preferably by at least 50%, and most preferably by at least 90%

Process for Preparing the Filled Polymeric Layer and the Composite

The process for preparing the filled polymeric material and the composite material may employ a process described in International Patent Application Publication WO 2010/021899 (published on Feb. 25, 2010 by Mizrahi), see for example paragraphs 092-107, incorporated herein by reference.

The composite material may be prepared using a process that results in the filled polymeric material (e.g., core layer) being bonded to at least one adjoining layer (e.g., a metallic sheet) and preferably being interposed between two layers (e.g., two metallic layers) and bonded to one or both layers. The process may include one or any combination of steps of heating, cooling, deforming (e.g., forming, such as by stamping), or bonding, in order to arrive at a final desired article. It is envisioned that at least one, or even all of the adjoining layers (e.g., metallic layers) may be provided in the form of a rolled sheet, a forging, a casting, a formed structure, an extruded layer, a sintered layer, or any combination thereof.

The sheets may be heated to a temperature greater than about 90° C. (e.g. greater than about 130° C., or greater than about 180° C.). Preferably, the sheets are heated to a temperature greater than about $T_{min}$, where $T_{min}$ is the highest glass transition temperature ($T_g$) and melting temperature ($T_m$) of the thermoplastic of the filled polymeric material. The metallic sheets, the filled polymeric material, or both may be heated to a maximum temperature above which the polymer (e.g., the thermoplastic polymer) may undergo significant degradation. The thermoplastic polymer may be heated to a temperature preferably less than about 350° C., more preferably less than about 300° C. The heated polymer may be mixed with the metallic fiber, and with any additional fillers. The heated polymer (e.g., thermoplastic polymer) may be extruded as a sheet layer. The sheet layer may be extruded directly between the metal faces, or placed between the metal faces later in the process or in a separate step. The process may include one or more steps of drying the polymer so that the concentration of water in the polymer is below a predetermined maximum moisture concentration. A step of drying the polymer may occur before, during, or after a step of heating the polymer. The process may include one or more steps of storing a polymer, a polymeric core layer, or a composite material in low humidity environment so that the concentration of water in the polymer is maintained below a predetermined maximum moisture concentration.

The polymeric core layer may be a homogeneous layer or may comprise a plurality of sublayers. For example, the filled polymeric material may contain an adhesive layer such as described in International Patent Application Publication WO 2010/021899 (published on Feb. 25, 2010 by Mizrahi).

The process for fabricating the composite material may also include one or more steps of heating one or more metal layers, applying pressure to the layers, calendaring a polymer (e.g., a thermoplastic polymer or the thermoplastic polymer compounded with the metallic fiber and the optional fillers), and annealing the composite sheet (e.g., at a temperature greater than the melting temperature of any thermoplastic polymer in the material).

The process for preparing the filled polymeric material (e.g., a core layer for the sandwich composites herein) may include a step of contacting the fiber and at least a portion of the polymer (e.g., thermoplastic polymer), blending the fiber and at least a portion of the polymer, or both. The process of forming the polymeric layer may be a continuous process or a batch process. Preferably, the process is a continuous process. The blending or contacting step may include heating the polymer to a maximum temperature greater than about 90° C., greater than about 140° C., greater than about 170° C., or greater than about 190° C. The blending or contacting step may include heating the polymer to a maximum temperature less than about 350° C., less than about 300° C., less than about 280° C., less than about 270° C., or less than about 250° C.

The process may employ one or more steps of applying pressure when at least some of the polymer of the filled polymeric material is at a temperature greater than about 80° C., preferably greater than about 120° C., more preferably greater than about 180° C., even more preferably greater than about 210° C., and most preferably greater than about 230° C. The step of applying pressure may employ a maximum pressure greater than about 0.01 MPa, preferably greater than about 0.1 MPa, more preferably greater than about 0.5 MPa, even more preferably greater than about 1 MPa, and most preferably greater than about 2 MPa. The maximum pressure during the step of applying pressure may be less than about 200 MPa, preferably less than about 100 MPa, more preferably less than about 40 MPa, and most preferably less than about 25 MPa. The process may also include a step of cooling the composite material (e.g. to a temperature below $T_{min}$, preferably below the melting temperature of polymer of the filled polymeric material, and more preferably below about 50° C.).

The composite material may be or include a laminate, such as described in International Patent Application Publication WO 2010/021899 (published on Feb. 25, 2010 by Mizrahi).

It may desirable to prevent water (liquid, gas, or solid) from contacting the polymeric material so that the moisture level in the polymeric material is low, so that the filler in the polymeric material does not corrode, or both. As such, the process for preparing the composite material may include one or more steps of substantially protecting an edge of the composite material from contact with a liquid or gas. For example, a coating or protective layer may be placed over one or more (or preferably all) of the edges of a polymeric layer (core layer), one or more (or preferably all) of the edges of the composite material may be sealed, or any combination thereof. If employed, a coating or protective layer placed over an edge of a polymeric layer preferably includes one or more materials that have a relatively low permeability to moisture compared to the polymer of the filled polymeric material. Any material having relatively low permeability to moisture may be used. Without limitation, a low permeability material may include a layer of polyethylene vinyl alcohol or a copolymer thereof, a layer of a polyolefin homopolymer, or a copolymer consisting substantially of one or more olefins, or any combination thereof. A coating or protective layer may be permanently attached to the polymeric layer, to the metallic layer or both. Alternatively, a coating or protective layer may be used temporarily. For example, a coating or protective layer may be removed prior to one or more forming steps, prior to one or more welding steps, prior to one or more electrocoating steps, or prior to one or more painting steps. Any edges of the composite material may be sealed using any art known mean that forms one or more sealed spaces between the metallic layers. By way of example, the metallic layers may be welded together near an edge. The metallic layers may be welded together along the entire periphery of the composite material.

One or more steps of monitoring the quality of the parts may be employed during or after assembly of components of the polymeric layer or the composite material. The monitoring may be for the purpose of assuring bond integrity between two or more layers, assuring proper dispersion of fibers, detecting surface abnormalities (such as cracks, blemishes, creases, roughness, and the like), detecting voids, determining the thickness distribution (e.g., average thickness, mean thickness, thickness variation, minimum thickness, maximum thickness, or any combination thereof) of one or any combination of layers of the composite, or any combination thereof.

One approach may include a step of monitoring the part (e.g., the polymeric material or the composite material) with one or more probes. The monitoring may be done optically (such as to detect surface defects, to determine a thickness or thickness distribution, a temperature such as by infrared measurement, or any combination thereof). It may be done by measuring a response of the part to one or more external stimulus. For example, electrical conductivity, electrical resistivity, impedance, or some other electrical characteristic may be measured in response to or more applied electrical stimulus. For example a probe may be used to measure the electrical characteristic at one or more location on the part (consecutively and/or essentially simultaneously in response to the electrical stimulus. A magnetic characteristic may be monitored in similar manner. The stimulus may be a magnetic field and the response may be a mechanical response, an electrical response, a magnetic response, or any combination thereof. The monitoring may be done acoustically (e.g., using a probe or other source of sound waves such as ultrasound waves). Acoustical measurements may be employed for detecting voids, cracks, compositional distributions, and the like.

Figure 2:
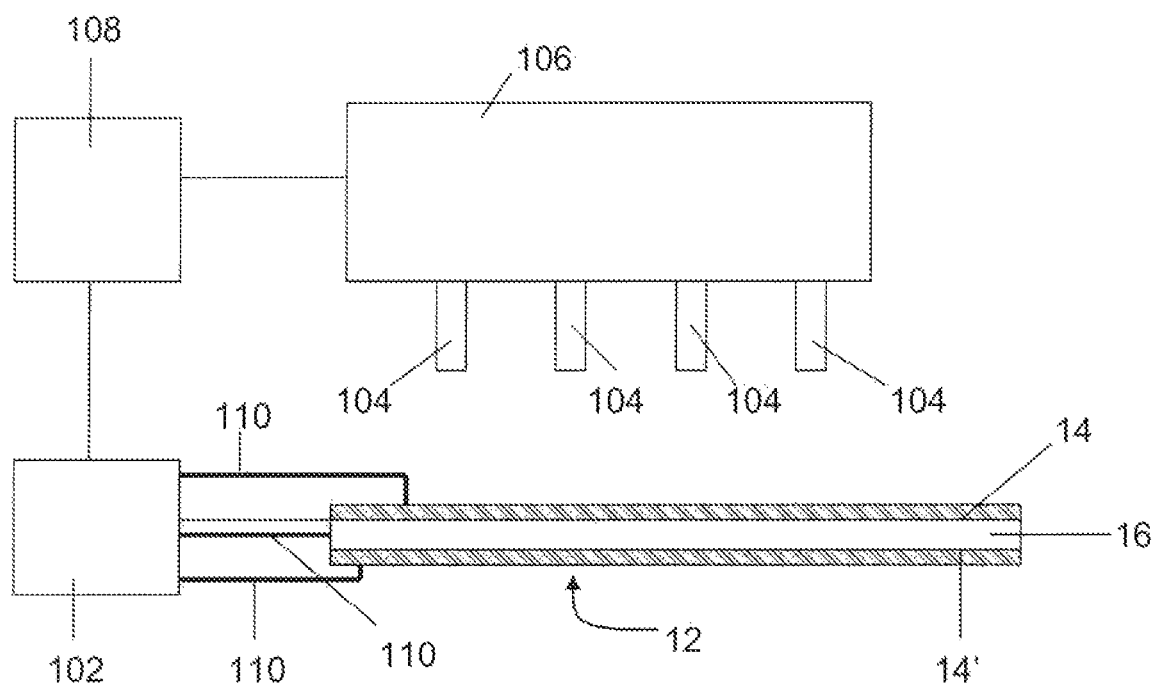
FIG. 2 is a diagram of an illustrative process for monitoring a polymeric material or a composite material.

A preferred assembly for monitoring may include a source of electricity one or more probes (e.g. a plurality of probes on a common carrier (possible even an array of probes) that essentially spans the part for assessing quality or that is translated over the part to obtain measurements), and at least one processor for receiving signals from the probes. The processor may perform an operation such as comparing the signals with a predicted value range for the measured part, and signaling when the measured value is outside of a predicted range, or otherwise falls within a certain predetermined range. FIG. 2 illustrates an example of such a system.

A layered workpiece 12 of the present teachings (e.g. a laminate of metallic layers 14, 14' sandwiching a polymeric layer 16 containing metallic fibers) is assembled. After the layers are joined a stimulus is applied (e.g., an electrical stimulus applied by an electrical source 102) to one or more of the metal layers 14, 14', the polymeric layer 16, or any combination thereof. The electrical stimulus may be transmitted to the one or more metal layers using one or more wires 110 or other means of electrical communication.

One or more probes 104 may be carried by a carrier 106, and will measure a response of the workpiece to the stimulus. The probes may be on one or both sides of the workpiece. The measured response may be signally transmitted to a processor 108, which may also be in controlling or other signaling communication with the stimulation source. (e.g. electrical source 102).

It will be appreciated that the monitoring process described herein may also be used for monitoring a polymeric material (e.g., a pellet, a sheet, or other sample of the polymeric material).

Forming Process

The composite material of the present invention may be subjected to a suitable forming process, such as a process that plastically deforms a material and may include a step of stamping, roll forming, bending, forging, punching, stretching, coiling, some other metalworking, or any combination thereof. A preferred forming process is a process that includes a step of stamping the composite material. The stamping process may occur at or near ambient temperatures. For example, the temperature of the composite material during stamping may be less than about 65° C., preferably less than about 45° C., and more preferably less than about 38° C. The forming process may involve drawing regions of the composite material to various draw ratios. In one aspect of the invention, the composite material is subjected to a step of drawing to a relatively high draw ratio without breaking, wrinkling, or buckling. For example, it is subjected to a step of drawing so that at least a portion of the composite is drawn to a draw ratio greater than 1.2. Desirably, the composite material may be capable of being drawn and is drawn to a maximum draw ratio greater than about 1.5, preferably greater than about 1.7, more preferably greater than about 2.1, and most preferably greater than about 2.5. The cracking limit of the draw ratio may be determined using the circular cup drawing test as described by Weiss et al. (M. Weiss, M. E. Dingle, B. F. Rolfe. and P. D. Hodgson, "The Influence of Temperature on the Forming Behavior of Metal/Polymer Laminates in Sheet Metal Forming", Journal of Engineering Materials and Technology, October 2007, Volume 129, Issue 4, pp. 534-535), incorporated herein by reference. The forming process may include a step applying a pressure to a die (e.g., a die having a hardness, as measured according to Mohrs hardness scale, greater than the hardness of the metallic fibers) in contact with the composite material.

Suitable forming processes that may be employed include those described in International Patent Application Publication WO 2010/021899 (published on Feb. 25, 2010 by Mizrahi), see for example paragraphs 105-107, incorporated herein by reference.

After forming a composite material, the process may include one or more steps of protecting an edge of the composite material to reduce the penetration of moisture into the filled polymeric material. Any of the aforementioned steps for protecting an edge of the composite material may be used.

Characteristics of Composites

The polymeric layer, the composite material, or both, may have a low springback angle, a relatively low electrical resistivity, good weldability (e.g., using resistance welding), relatively low thermal conductivity, relatively low sound transmission, or any combination thereof, such as described in International Patent Application Publication WO 2010/021899 (published on Feb. 25, 2010 by Mizrahi).

Preferably, the filled thermoplastic material, the composite material, or both is weldable (e.g., weldable using a resistance welding technique such as spot welding, seam welding, flash welding, projection welding, or upset welding) and has a relatively low electrical resistance. The teachings herein thus also contemplate one or more steps of welding the composite materials taught herein. The electrical resistance of the composite material in the through-direction may be described by the sum of the electrical resistance of the metallic layers and the core layer. Typically, the electrical resistance of the metallic layers is much less than the electrical resistance of the core layer, such that the electrical resistance of the composite material may be estimated by the electrical resistance of the core layer. The resistivity (e.g., the resistivity measured in the through-thickness direction, normal to the plane of a sheet) may be measured using AC modulation and determined from the voltage drop, V, and the current, I:

$$\text{Resistivity} = (V/I)(A/t)$$

where A is the area of the sheet, and t is the thickness of the sheet. The resistivity (in the through-thickness direction) of the composite material, the core layer, or both, may be relatively low (e.g., the composite material, the core layer (e.g., the filled thermoplastic material), or both, may be characterized by a resistivity less than about 100,000 Ω·cm, preferably less than about 10,000 Ω·cm, more preferably less than about 3,000 Ω·cm, and most preferably less than about 1,000 Ω·cm).

The composite materials may be welded using any welding process known to one of ordinary skilled in the art of welding metals. The welding process may include one or more of the steps, devices, or processes described in International Patent Application Publication WO 2010/021899 (published on Feb. 25, 2010 by Mizrahi), U.S. patent application Ser. No. 61/290,384 (filed on Dec. 28, 2009 by Mizrahi), and paragraphs 22-122 of U.S. patent application Ser. No. 12/978,974 (filed on Dec. 27, 2010 by Mizrahi), all incorporated herein by reference.

Preferred composite materials have a relatively good corrosion resistance. The composite material preferably is characterized by a rate of corrosion of a surface of a metallic layer facing a core layer, the core layer including a polymer and a metallic filler, that is lower than (more preferably at least 50% lower than) the rate of corrosion of a surface of a metallic layer facing a core layer of an identical composite material except the metallic filler in the core layer is replaced with the polymer of the core layer. For example, the composite material may have a rate of corrosion of a surface of a metallic layer facing a core layer, the core layer including a sacrificial filler, that is lower than the rate of corrosion of a surface of a metallic layer facing a core layer of an identical composite material except the sacrificial filler is replaced with the polymer of the core layer. The rate of corrosion in water may be determined by placing samples of a composite material having predetermined dimensions, in a water bath at a predetermined corrosion test temperature for a predetermined corrosion test time, and measuring the amount of corrosion on a surface. The rate of corrosion in salt water may be determined by placing samples of a composite material having predetermined dimensions, in a salt water bath having a predetermined salt concentration, at a predetermined corrosion test temperature for a predetermined corrosion test time, and measuring the amount of corrosion on a surface. Without limitation the, corrosion test temperature may be about 40° C., and the corrosion test time may be about 168 hours.

Microstructure of Weld

It is possible that weld joints made using various composites taught herein may exhibit a variation of microstructures across the composite such as described in International Patent Application Publication WO 2010/021899 (published on Feb. 25, 2010 by Mizrahi), see for example paragraphs 112-117, incorporated herein by reference.

The composite materials of the present invention may be used in any number of applications requiring one or any combination of the properties described herein, including but not limited to relatively low density, relatively low thermal conductivity, relatively high stiffness to density ratio, or relatively low acoustical transmission. Exemplary applications which may employ the composite materials of the present invention may include automotive and other transportation related applications, building construction related applications, and appliance related applications. The composite materials may be used in applications such as an automotive panel, a truck panel, a bus panel, a container (e.g., a container used for shipping), a panel on a train car, a panel on a jet, a tube (e.g., a bicycle tube), a motorcycle panel (e.g., a cowling or fairing), a trailer panel, a door inner (e.g., a vehicle door inner), a roof panel, a vehicle hood inner, a vehicle floor pan, a vehicle rear shelf panel, a vehicle rear compartment panel, a vehicle back seat pane, a vehicle decklid inner, a panel on a recreational vehicle, a panel on a snowmobile, an automotive bumper fascia, a spoiler, a wheel well liner, an aerodynamic ground effect, an air dam, a container, a bed liner, a divider wall, an appliance housing, a vehicle fuel filler door, a vehicle bumper, a decorative insert, a duct, a grab bar, a storage compartment door, a housing for an electronic device (such as a cellular phone, a computer, a camera, a tablet computer, a music or video storage device, or a music or video player), a console, an air inlet part, a battery housing, a grille, a wheel well, or a seat pan. The composite materials may be used as a building construction material, such as an exterior trim element, flashing, gutters, shingles, walls, flooring, countertops, cabinet facing, window frames, door frames, paneling, vents, ducts, planking, framing studies, shelving, plumbing fixtures, sinks, shower pans, tubs, and enclosures. An exemplary application is an vehicle body panel (e.g., a body outer skin of a vehicle such as an automobile). Automobile panels which may use the composite materials described herein include front quarter panels, rear quarter panels, door panels, hood panels, roof panels, or otherwise. The automotive panel may have a class A, class B, or class C surface, preferably a class A or class B surface, and more preferably a class A surface. The composite materials herein may also include one or more decorative outer surfaces or veneers, such as a metal veneer, a wood veneer, a polymeric veneer, or otherwise. The outer surface may have a different texture, color or other appearance as an opposing layer. For example, a ferrous outer layer may be colored so that it simulates a copper color, a bronze color, a brass color, a gold color, or some other color.

The composite materials of the present invention may be used in a process that includes a step of coating the composite material, such as an electrocoating process, a paint process, a powder coat process, any combination thereof, or the like. If employed, the coating process may include one or more steps of cleaning or otherwise preparing the surface, one or more steps of heating or baking the coating (e.g., at a temperature greater than about 100° C., preferably greater than about 120° C.), or any combination thereof. The coating may be applied by any conventional means, such as by a dipping process, a spraying process, or with a process employing an applicator such as a roller or a brush. As such, the composite material preferably is free of ingredients (e.g., low molecular weight ingredients) that leach out and contaminate a bath of a coating process, such as a bath of an electrocoat process. Likewise, methods herein include one or more coating steps that are free of bath contamination due to an ingredient of the composite.

The composite material (e.g., a stamped part formed of the composite material) may be used in an assembly which requires joining the composite material to one or more other materials or parts. For example, the composite material may be mechanically joined to another part using a fastener, or chemically joined to another part using an adhesive, an adhesion promoter (e.g., a primer), or both. Other means of joining include welding, brazing, and soldering. One or any combination of these joining methods may be employed.

Preferably, the composite material does not delaminate (e.g., the metallic layer does not delaminate from the core layer) during the processing of the composite material to form a part or an assembly, or during the use of the part. As such, the composite material preferably does not delaminate during a stamping operation, during a joining operation (e.g., during a welding operation), or both.

Another aspect of the invention contemplates a method for post-consumer reclamation, recycling, or both of parts made using the present invention. One approach envisions providing a part having the composite structure taught herein, and subjecting it to a step of separating hydrocarbon compounds (e.g., by an elevated temperature heating step) from the metallic materials. Either or both of the hydrocarbon compounds or the metallic materials can be recovered and re-used. Another approach envisions recycling by grinding the composite material or otherwise forming particles from the composite materials, and optionally providing the particles as an ingredient for the core material of a composite (such as a composite material described herein).

It should be appreciated that the compositions of the following examples may be varied by about ±20% and give similar results (e.g., within about ±20%). Further, other materials taught herein may be substituted for those stated and similar results are contemplated.

EXAMPLES

Example 1

A filled thermoplastic material is prepared by mixing about 15 volume % low carbon steel fibers having a diameter from about 4 to about 40 μm, and a length from about 1 to about 10 mm and about 85 volume % of a copolyamide of about 50 wt. % nylon 6 and about 50 wt. % nylon 6,9 (the copolymer characterized by an elastic modulus of about 300 MPa measured according to ISO 527-2, a melting point of about 130° C. as measured according to ISO 11357, and an elongation at break of about 900% measured according to ISO 527-3). The filled thermoplastic material is mixed at a temperature from about 190° C. to about 250° C. The filled thermoplastic material is then placed between two sheets of low carbon steel, each having a thickness of about 0.2 mm. The materials are then pressed at a temperature from about 200° C. to about 230° C. with a pressure of about 1 to about 22 MPa. The composite material has a core thickness of the filled thermoplastic material of about 0.4 mm. The composite material is stamped in a high speed stamping operation with a draw ratio greater than about 3, and no cracks or other surface defects are observed. After stamping, the surface of the composite material is relatively smooth compared to the surface of a monolithic low carbon steel sample having the same total thickness and stamped under the same conditions. The composite material is then submitted to a typical e-coat process and painted with a primer and black paint. The painted surface has a smooth finish with no pitting, no orange peeling, and no other visible surface defects. The painted surface is characterized as a class A finish. The surface of the painted composite material is smoother than the surface of a similarly processed monolithic sample of low carbon steel having a thickness of about 0.8 mm.

Example 2

A composite material is prepared using the same materials, composition, and method as Example 1, except the fibers are replaced with low carbon fibers having a generally rectangular cross-section in the direction transverse to the length of the fibers. The fibers have an average length of about 2.3 mm. The average cross-sectional area of the fibers is about 0.0045 mm². The ratio of the width to the thickness of the fibers is about 2 to 8. The composite material has a thickness of about 0.8 mm. The composite material is stacked with a sample of cold rolled steel having a thickness of about 0.8 mm. The stack is placed in a spot welding machine between a pair of weld tips having a diameter of about 13 mm. A force of about 2.2 kNt is applied to the weld tips. The resistivity of the composite material in the through-thickness direction is determined while under force of 2.2 kNt. Thus determined, the electrical resistivity of Example 2 composite material is about 0.1 Ω·cm or less. When welded using weld schedules typical for two sheets of cold rolled steel having a thickness of about 0.8 mm, the composite material welds to the cold rolled steel, producing a weld nugget having a diameter greater than the diameter of the weld tips. No extra heating, no extra weld cycles, and no extra current are required to produce a good weld with Example 2.

Example 3

A composite material is prepared using the same materials, composition, and method as Example 1, except the metal sheets are replaced by 0.2 mm thick sheets of a high strength steel having a yield strength of about 350 MPa, a tensile strength of about 460 MPa, and an elongation of about 22%. The composite material is expected to have a yield strength of about 193 MPa, a tensile strength of about 253 MPa, and an elongation of about 22%. The density of the composite material is calculated to be about 34% less than a monolithic sheet of the low carbon steel having the same thickness (about 0.8 mm). The composite material is calculated have a yield strength that is about 50 MPa or more higher than the yield strength of the monolithic sheet of low carbon steel having the same thickness. The composite material is calculated to have a tensile strength that is at least about 90% of the tensile strength of the monolithic sheet of low carbon steel having the same thickness. The composite material is calculated to have a flexural modulus that is at least about 85% of the flexural modulus of the monolithic sheet of low carbon steel having the same thickness.

Other examples within the scope of the teachings are illustrated in paragraphs 126-133 and 138-154 and Tables 1-4 (examples 1-4, 8-26, 28-31, and 33-34) of International Patent Application Publication No. WO 2010/021899, and paragraphs 114-117, and 119-127 and 129 (examples 1-4, 6-10, and 11A) and FIGS. 2A, 2B, 2C, 2D, 2E, 2F, 2G, 2H, 2I, 2J, 3, 4, 5, 6, 7, 8, 9A, and 9B of U.S. patent application Ser. No. 12/978,974 (filed on Dec. 27, 2010), both incorporated herein by reference.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "x" parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and "copolymer" and "homo- and copolymerization", respectively.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A light weight composite comprising:
   a first metallic layer;
   a second metallic layer; and
   a core layer extrudate including a filled polymeric material having a thickness disposed between the first metallic layer and the second metallic layer;
   wherein the filled polymeric material includes one or more polymers and a mass of metallic fibers mixed with and distributed within the polymer,
   wherein at least 70% by weight of the polymer is a thermoplastic that includes a polyethylene copolymer having at least 60% ethylene;
   the polymer is present at a concentration of about 65 volume percent or more, based on the total volume of the filled polymeric material;
   the metallic fibers include ribbon fibers having a generally rectangular cross-section in the direction transverse to the length of the fibers;
   the metallic fibers have a weight average length of 1 mm to 55 mm;
   the polymer has an elongation at failure of at least about 50% as measured according to ASTM D638-08;
   the concentration of metallic fibers in the filled polymeric material is from 3 to 25 volume %, based on the total volume of the filled polymeric material;
   the combined volume of the polymer and the metallic fibers is at least about 90% by volume, based on the total volume of the filled polymeric material;
   the concentration of pores and voids in the filled polymeric material is from 0 to about 10 volume %, based on the total volume of the filled polymeric material;
   the metallic fibers are present as a mass of fibers that spans the thickness of the filled polymeric material, and electrically connects the two metallic layers;
   the composite material has a thickness of 0.3 mm or more and the filled polymeric material has a thickness that is 40% or more of the total volume of the composite material and wherein the composite has a weld current range of 1.5 kA or more and is capable of a draw ratio of at least 1.5 in a stamping operation.

2. A process of forming a composite part comprising a step of stamping the light weight composite of claim 1.

3. The process of claims 2, wherein the stamping step includes
   a step of drawing at least one portion of the light weight composite by a draw ratio greater than about 1.5; and the process includes
   a step of welding the light weight composite to at least one additional metal containing material, wherein the welding step is selected from group consisting of resistance welding, laser welding, and electron beam welding.

4. An automotive part manufactured using the process of claim 3.

5. A stamped and welded article comprising:
a sheet of steel spot welded to a light weight composite, and including at least one weld nugget joining the sheet of steel and the light weight composite;
wherein the light weight composite has a weld current range of 1.5 kA or more and is stamped to a draw ratio greater than 1.5, and comprises:
a first steel sheet having a thickness from about 0.10 mm to about 1.5 mm;
a second steel sheet having a thickness from about 0.10 mm to about 1.5 mm; and
a core layer, wherein the core layer is an extrudate consisting of a filled polymeric material;
wherein the light weight composite is a sandwich structure including the core layer sandwiched between the first steel sheet and the second steel sheet, the volume of the core layer is 30 volume % to 92% of the total volume of the light weight composite, and the total thickness of the two first and second steel sheets is from 5% to 70% of the total thickness of the light weight composite;
wherein the filled polymeric material includes one or more polymers and a mass of plain carbon steel fibers mixed with and distributed within the polymer,
wherein at least 70% by weight of the polymer is a thermoplastic;
the polymer is present at a concentration of about 75 volume percent or more, based on the total volume of the filled polymeric material, and includes a thermoplastic having a melting point greater than about 80° C. and less than about 200° C., as measured according to ASTM D3418-08 ;
the one or more polymers includes a polymer having a number average molecular weight greater than 20,000 and that consists entirely of one or more α-olefins;
the polymer has a melt index sufficiently high so that the polymer can be processed using extrusion equipment;
the polymer has an elongation at failure of at least about 50% as measured according to ASTM D638-08;
the amount of the polymer that is a grafted polymer is 0-10 weight percent;
the plain carbon steel fibers include ribbon fibers;
the plain carbon steel fibers have a weight average length of less than 25 mm and includes fibers that are not straight;
the concentration of plain carbon steel fibers in the filled polymeric material is greater than about 3 volume % and less than 25 volume % based on the total volume of the filled polymeric material;
the volume ratio of the polymer to the plain carbon steel fibers is greater than 3:1;
the plain carbon steel fibers have a ratio of average length to average width from about 8 to about 100;
the concentration of pores and voids in the filled polymeric material of the extrudate is from 0 to about 10 volume %, based on the total volume of the filled polymeric material of the extrudate;
the plain carbon steel fibers are present as a mass of fibers, the filled polymeric material has a thickness, and the mass of fibers spans the thickness of the filled polymeric material; and
the light weight composite has a formed configuration from being stamped or otherwise cold-formed on a press machine.

6. The article of claim 5 wherein the plain carbon steel fibers have an average width of 50 to 200 μm; and the light weight composite is free of ingredients that could leach out and contaminate a bath of an electrocoat process.

7. The article of claim 5, wherein the composite material has a thickness of 0.3 mm or more and the filled polymeric material has a thickness that is 40% or more of the total volume of the composite material.

8. The article of claim 5, wherein the light weight composite includes a planar contact between a plain carbon steel fiber and a metallic layer, a planar contact between plain carbon steel metallic fibers, or both.

9. The article of claim 8, wherein the polymer includes more than one α-olefins.

10. The article of claim 9, wherein the plain carbon steel fiber concentration is less than 20 volume % based on the total volume of the filled polymeric material and the plain carbon steel fibers have an average length of 1 mm or more.

11. The article of claim 10, wherein the plain carbon steel fibers have a ratio of width to thickness of 3 to 15.

12. The article of claim 11, wherein the volume of the filled polymeric material is at least 90% of the volume of the space between the first and second metallic layers.

13. The article of claim 11, wherein the fraction of the metallic fibers that contact a metallic layer along at least half of the length of the fiber is about 0.04 or less; and
wherein the light weight composite material has a thickness of 0.3 mm or more; the combined volume of the polymer and the metallic fibers is at least about 95% by volume, based on the total volume of the filled polymeric material.

14. The article of claim 13, wherein the light weight composite material has a static contact resistance of 0.0020 Ω or less; the fibers have a tensile elongation at failure greater than 30% as measured according to ASTM A370-03a; and the filled polymeric material is essentially free of low molecular weight compounds which may become volatilized during a resistance welding process.

15. A light weight composite comprising:
a first metallic layer having a thickness from about 0.10 mm to about 1.5 mm and including aluminum or an aluminum alloy;
a second metallic layer having a thickness from about 0.10 mm to about 1.5 mm; and
a core layer extrudate consisting of a filled polymeric material sandwiched between the first metallic layer and the second metallic layer, wherein the volume of the core layer is 30 volume % to 92% of the total volume of the light weight composite, and the total thickness of the two first and second metallic layers is from 5% to 70% of the total thickness of the light weight composite;
wherein the filled polymeric material includes one or more polymers and a mass of metallic fibers mixed with and distributed within the polymer,
wherein at least 70% by weight of the polymer is a thermoplastic;
the polymer is present at a concentration of about 65 volume percent or more, based on the total volume of the filled polymeric material;
the polymer has an elongation at failure of at least about 50% as measured according to ASTM D638-08;
the one or more polymers includes a polymer having a number average molecular weight greater than 20,000 and that consists entirely of one or more α-olefins;
the polymer has a melt index sufficiently high so that the polymer can be processed using extrusion equipment;

the amount of the polymer that is a grafted polymer is 0-10 weight percent;
the metallic fibers include ribbon fibers;
the concentration of pores and voids in the filled polymeric material is from 0 to about 10 volume %, based on the total volume of the filled polymeric material;
the metallic fibers are present as a mass of fibers, the filled polymeric material has a thickness, and the mass of fibers spans the thickness of filled polymeric material;
wherein the ribbon fibers have a generally rectangular cross-section in the direction transverse to the length of the fibers;
the metallic fibers are characterized by a weight average length from about 200 μm to less than 25 mm, and a cross-sectional area of $4 \times 10^{-4}$ mm² or more;
the metallic fibers include aluminum fibers, aluminum alloy fibers, or both;
the metallic fiber concentration is less than 20 volume % based on the total volume of the filled polymeric material;
the filled polymeric material includes metallic fibers that are not straight;
the polymer includes a thermoplastic polymer having a melting point greater than about 80° C., as measured according to ASTM D3418-08 and a crystallinity greater than 10%;
the thermoplastic polymer includes a polyethylene copolymer consisting of one or more α-olefins;
the composite has a range of 1.5 kA or more and is capable of a draw ratio of at least 1.5 in a stamping operation;
the volume of the filled polymeric material is at least 90% of the volume of the space between the first and second metallic layers; and
the volume ratio of the polymer to the metallic fiber is greater than 3:1.

16. A lightweight composite comprising:
A sheet of a filled polymeric material interposed between a first metallic layer and a second metallic layer, wherein the filled polymeric material comprises:
i. a thermoplastic polymer wherein the thermoplastic polymer is a semi-crystalline polymer having a crystallinity of about 10 wt.% to about 80 wt. % as measured using differential scanning calorimetry and a melting point greater than about 80° C, as measured according to ASTM D3418-08, and is a low density polyethylene, a linear low density polyethylene, a very low density polyethylene, or any combination thereof;
ii. an elastomer having a tensile modulus at 100% elongation of less than about 3 MPa as measured according to ASTM D638-08; and
iii. a mass of metallic fibers distributed within the thermoplastic polymer;
wherein the metallic fibers include ribbon fibers having a generally rectangular cross- section in the direction transverse to the length of the fibers; and
the thermoplastic polymer has a number average molecular weight greater than 20,000;
the polymer has a melt index sufficiently high so that the polymer can be processed using extrusion equipment;
the polymer has an elongation at failure of at least about 50% as measured according to ASTM D638-08;
the concentration of pores and voids in the filled polymeric material is from 0 to about 5 volume %, based on the total volume of the filled polymeric material;
the metallic fibers are present as a mass of fibers, the filled polymeric material has a thickness, and the mass of fibers spans the thickness of filled polymeric material;
the metallic fibers are characterized by a weight average length greater from about 200 um to less than about 25 mm;
the metallic fibers include steel fibers;
the metallic fibers are present at a concentration of greater than 5 volume % and less than 25 volume % based on the total volume of the filled polymeric material;
the filled polymeric material includes metallic fibers that are not straight;
and the thermoplastic polymer and metallic fibers are present at a volume ratio of the thermoplastic polymer to the metallic fiber that is greater than about 2.2:1 ;
wherein the metallic fibers provide electric conductivity for welding;
wherein the sheet of the filled polymeric material is an extruded sheet provided in a form adapted for laminating between said first and second metallic sheets;
wherein the light weight composite is in a stamped form and is welded to a sheet of steel;
and wherein the light weight composite has a weld current range of 1.5 kA or more and is stamped to a draw ratio of greater than 1.5.

* * * * *